(12) United States Patent
Sahin et al.

(10) Patent No.: US 11,689,307 B2
(45) Date of Patent: Jun. 27, 2023

(54) METHODS, APPARATUSES AND SYSTEMS DIRECTED TO COMPLEMENTARY SEQUENCE ENCODING AND ENCODED COMPLEMENTARY SEQUENCE TRANSMISSIONS

(71) Applicant: IDAC Holdings, Inc., Wilmington, DE (US)

(72) Inventors: Alphan Sahin, Westbury, NY (US); Rui Yang, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 71 days.

(21) Appl. No.: 17/276,076

(22) PCT Filed: Sep. 13, 2019

(86) PCT No.: PCT/US2019/050947
§ 371 (c)(1),
(2) Date: Mar. 12, 2021

(87) PCT Pub. No.: WO2020/056225
PCT Pub. Date: Mar. 19, 2020

(65) Prior Publication Data
US 2022/0060272 A1  Feb. 24, 2022

Related U.S. Application Data

(60) Provisional application No. 62/731,085, filed on Sep. 13, 2018.

(51) Int. Cl.
*H04J 13/00* (2011.01)
*H04L 1/00* (2006.01)

(52) U.S. Cl.
CPC ........ *H04J 13/0011* (2013.01); *H04L 1/0042* (2013.01); *H04L 1/0057* (2013.01)

(58) Field of Classification Search
CPC .. H04J 13/0011; H04L 1/0042; H04L 1/0057; H04L 27/2615; H04L 5/023
See application file for complete search history.

(56) References Cited

U.S. PATENT DOCUMENTS

| | | | |
|---|---|---|---|
| 5,962,182 A * | 10/1999 | Katoh ................... | G03C 1/061 430/440 |
| 2010/0080266 A1* | 4/2010 | Zhang ................... | H04L 69/22 375/140 |

OTHER PUBLICATIONS

Davis et al., "Peak-to-Mean Power Control in OFDM, Golay Complementary Sequences, and Reed-Muller Codes", IEEE Transactions on Information Theory, vol. 45, No. 7, Nov. 1999, pp. 2397-2417.

(Continued)

*Primary Examiner* — Sung S Ahn
(74) *Attorney, Agent, or Firm* — Julian F. Santos

(57) ABSTRACT

Methods, apparatuses and systems directed to complementary sequence (CS) encoding and encoded CS transmissions are provided. Among the apparatuses is apparatus having a transmitter that may be configured to (i) transmit an encoded CS via a block based, e.g., orthogonal frequency division multiplexing (OFDM), waveform, and/or (ii) generate the encoded CS using a plurality of seed sequences and a plurality of information items, wherein: of the elements of the encoded CS encodes a first set of the plurality of information items; (b) phases of the encoded-CS elements encode a second set of the plurality of information items); and (c) the encoded-CS elements define a number of zeros that encode a third set of the plurality of information items. The encoded-CS elements may define respective numbers of zeros that collectively form the number of zeros that encode the third information-item set.

22 Claims, 19 Drawing Sheets

(56) References Cited

OTHER PUBLICATIONS

Golay, Marcel J. E., "Complementary Series", IRE Transactions on Information Theory, vol. 7, No. 2, Apr. 1961, pp. 82-87.
Turyn, R., "Hadamard Matrices, Baumert-Hall Units, Four-Symbol Sequences, Pulse Compression, and Surface Wave Encodings", J. Comb. Theory Ser. A, 16, 1974. pp. 313-333.
Sahin et al., "A Generic Complementary Sequence Encoder", arXiv:1810.02383 [cs.IT], Cornell University Library, Ithaca, NY, Oct. 4, 2018, pp. 1-29.
Parker et al., "Golay Complementary Sequences", WILEY Encyclopedia of Telecommunications, Jan. 19, 2004, pp. 1-18.
Sivaswamy, R., "Multiphase Complementary Codes", IEEE Transactions on Information Theory, vol. IT-24, No. 5, Sep. 1978, pp. 546-552.
Paterson, K.G.: "Generalized Reed-Muller codes and power control in OFDM modulation", IEEE Transactions on Information Theory, vol. 46, No. 1, Jan. 2000, pp. 104-120.
Holzmann et al., "A computer search for complex Golay sequences", The Australasian Journal of Combinatorics, 10, 1994, pp. 251-258.
Interdigital Inc., "On UL Signals and Channels in NR-Unlicensed", 3GPP Tdoc 3GPP R1-1807035, 3GPP TSG RAN WG1 Meeting #93, Busan, Korea, May 21-25, 2018, 19 pages.
Popovic, B. M., "Synthesis of Power Efficient Multitone Signals with Flat Amplitude Spectrum", IEEE Transactions on Communications, vol. 39, No. 7, Jul. 1991, pp. 1031-1033.
Budisin, S., Z., "Efficient Pulse Compressor for Golay Complementary Sequences," IEEE Electronics Letters, vol. 27, No. 3, Jan. 31, 1991, pp. 219-220.

\* cited by examiner $$f: \mathbb{Z}_2^m \to \mathbb{Z}_q$$

| | $x_1$ | $x_2$ | | $x_{m-1}$ | $x_m$ |
|---|---|---|---|---|---|
| $a_0$ | 0 | 0 | | 0 | 0 |
| $a_1$ | 0 | 0 | | 0 | 1 |
| | 0 | 0 | | 1 | 0 |
| | 0 | 0 | | 1 | 1 |
| $a_r$ | $r_1$ | $r_2$ | | $r_{m-1}$ | $r_m$ |
| $a_{2^m-1}$ | 1 | 1 | | 1 | 1 |

$f \longrightarrow$

FIG. 3

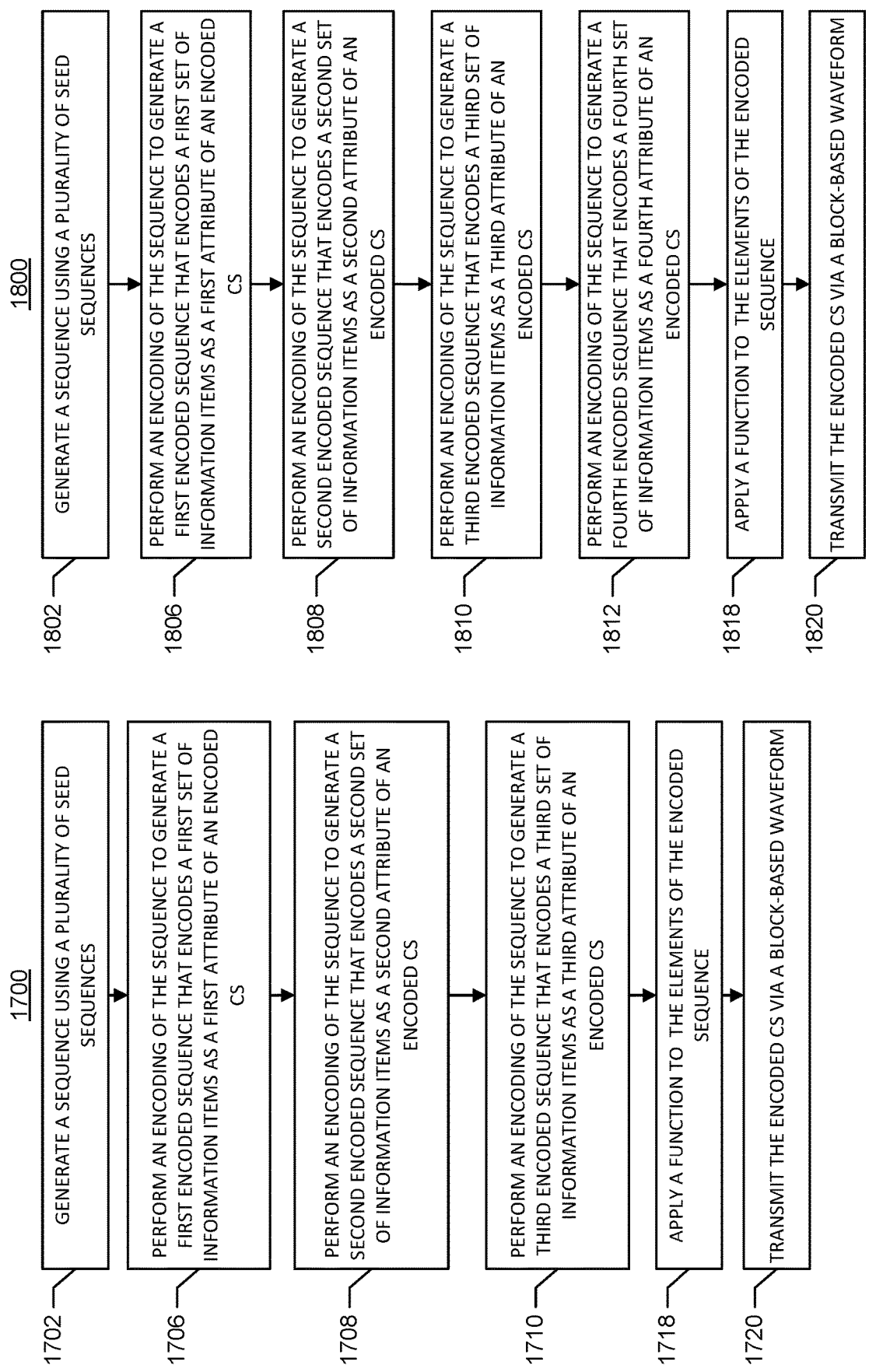

METHODS, APPARATUSES AND SYSTEMS DIRECTED TO COMPLEMENTARY SEQUENCE ENCODING AND ENCODED COMPLEMENTARY SEQUENCE TRANSMISSIONS

CROSS-REFERENCE TO RELATED APPLICATIONS

This application is a U.S. National Stage Application under 35 U.S.C. § 371 of International Patent Application No. PCT/US2019/050947, filed 13 Sep. 2019, which claims the benefit of U.S. Provisional Patent Application No. 62/731,085, filed 13 Sep. 2018, which is incorporated herein by reference.

BACKGROUND

Field

The present disclosure is generally directed to the fields of communications, software and encoding, including, for example, to methods, architectures, apparatuses, systems directed to complementary sequence encoding and encoded complementary sequence transmissions.

Related Art

Mobile communications are in continuous evolution and are already at doorsteps of its fifth incarnation, which is called, 5th Generation ("5G"). As with previous generations, new use cases have been proposed in connection with setting of requirements for the new system.

Such 5G system may correspond at least in part to a New Radio access technology ("NR") that meets 5G requirements. The NR access technology may be expected to support a number of use cases such as enhanced Mobile Broadband (eMBB), ultra-high reliability and low latency communications (URLLC), and massive machine type communications (mMTC). Each use case comes with its own set of requirements of spectral efficiency, low latency and massive connectivity, for example.

BRIEF DESCRIPTION OF THE DRAWINGS

A more detailed understanding may be had from the detailed description below, given by way of example in conjunction with drawings appended hereto. Figures in description, are examples. As such, the Figures and the detailed description are not to be considered limiting, and other equally effective examples are possible and likely. Furthermore, like reference numerals in the figures indicate like elements, and wherein:

FIG. 3 illustrates an example truth table representation of a generalized Boolean function;

FIGS. 15-18 are flow diagrams illustrating representative procedures in accordance with various embodiments

DETAILED DESCRIPTION

Figure 1A:
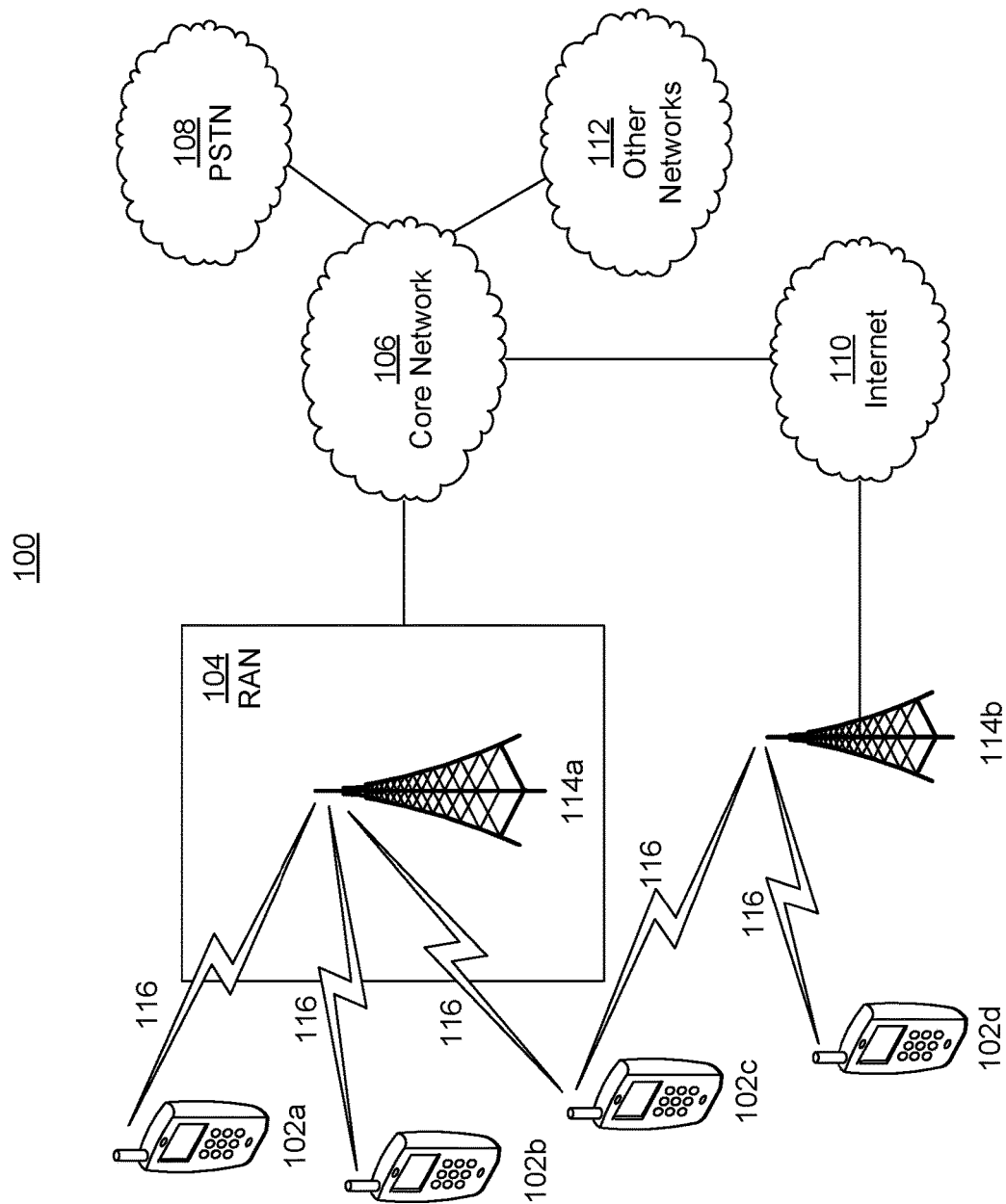
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
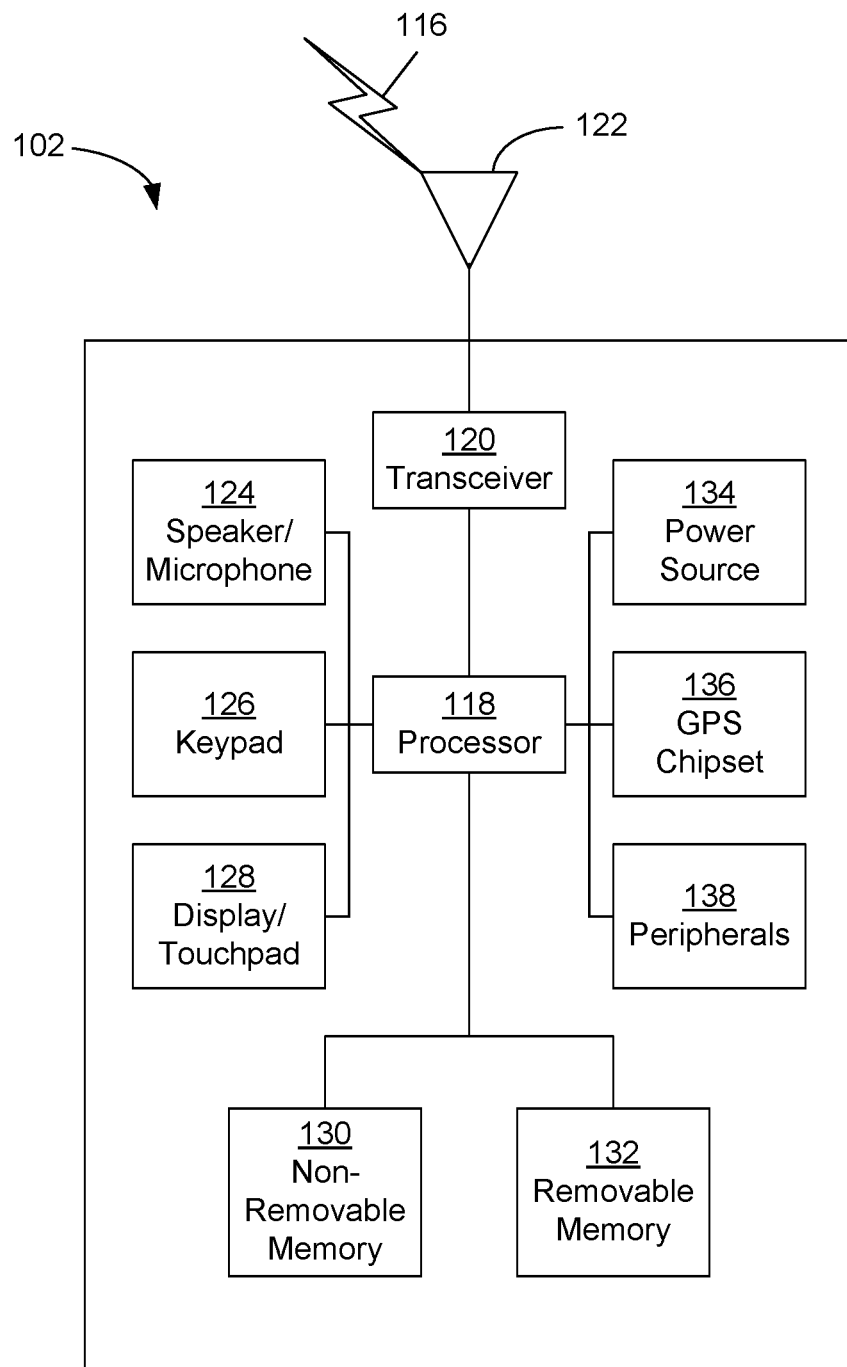
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
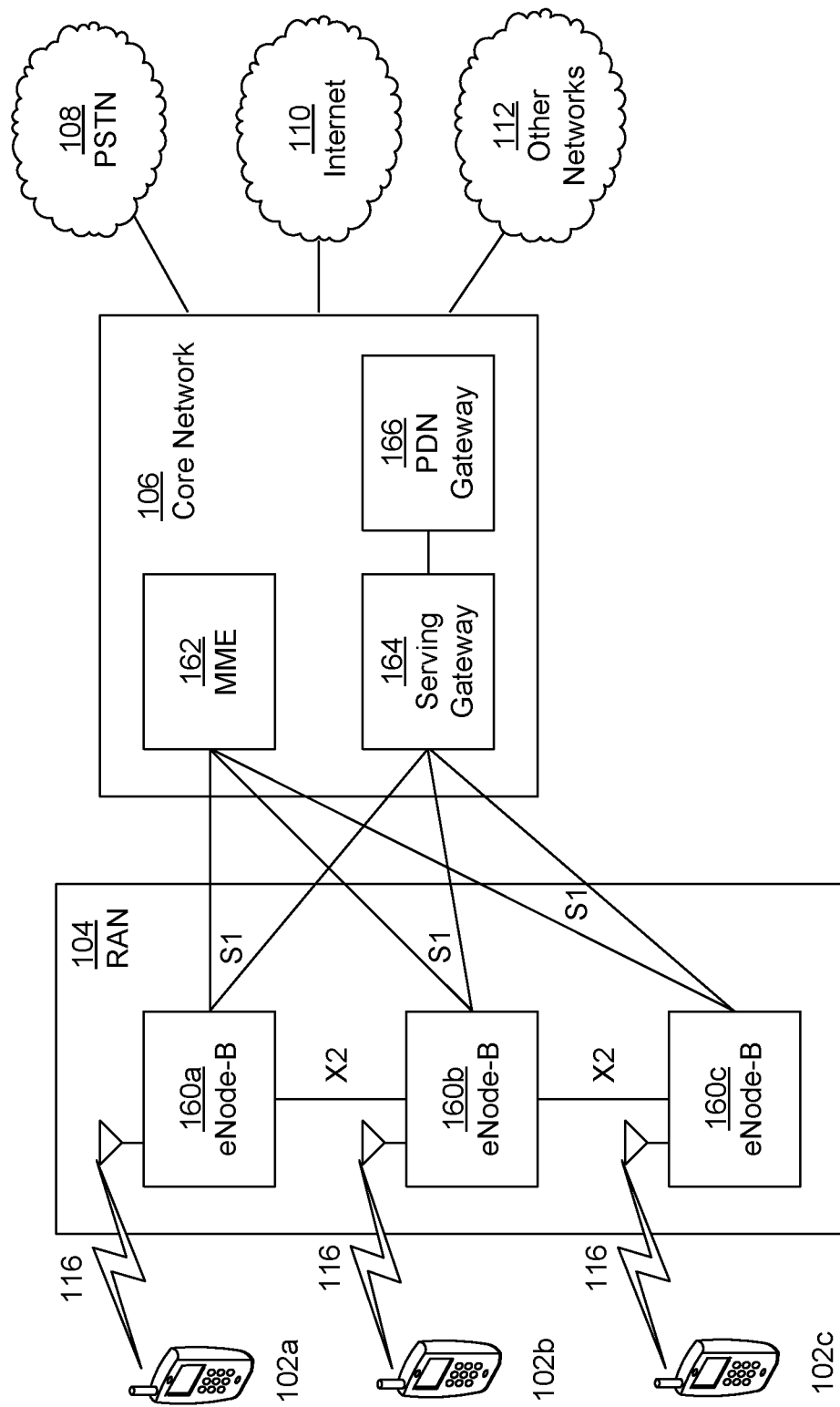
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function ƒ or switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11 ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11 ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
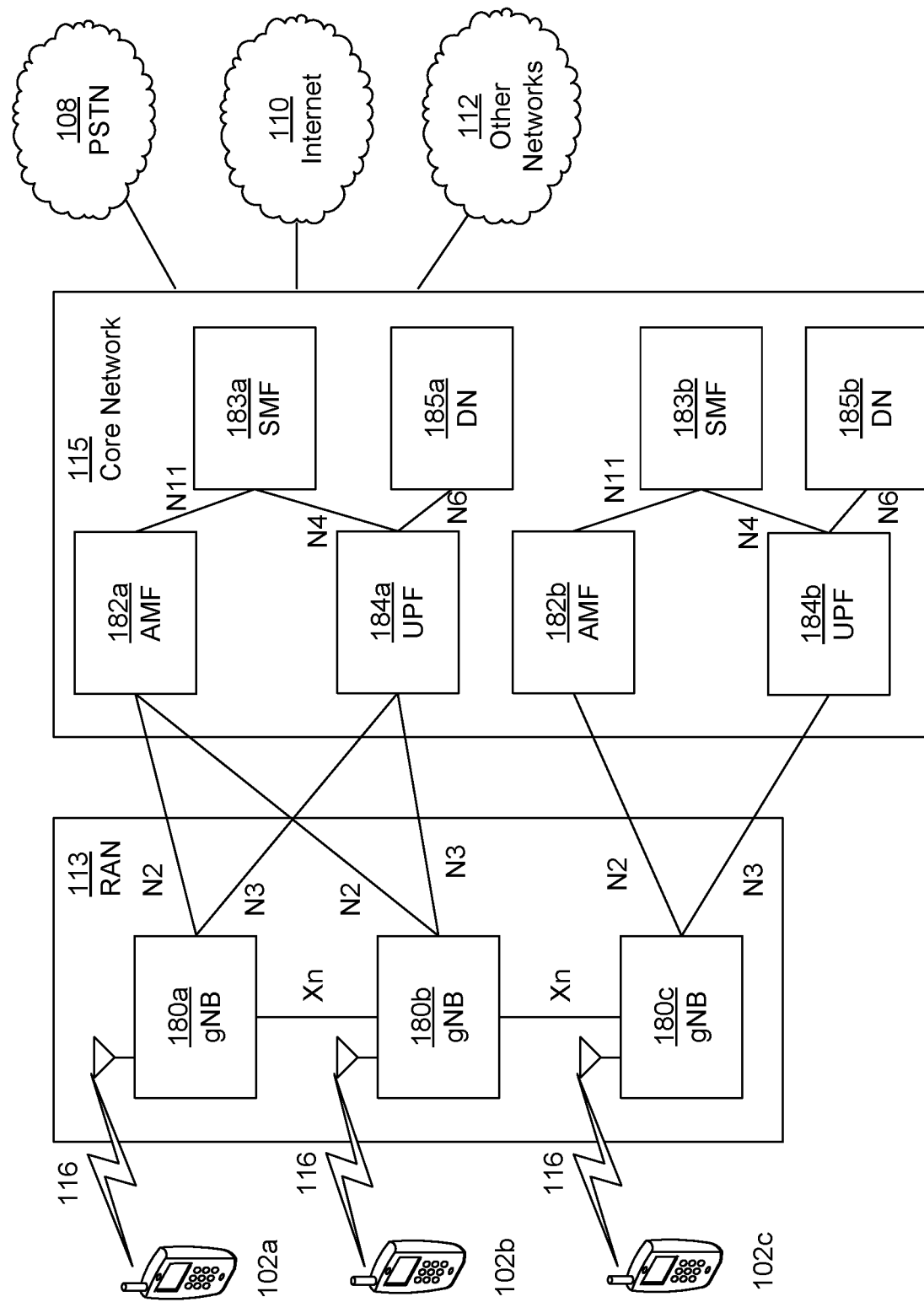
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

Figure 2:
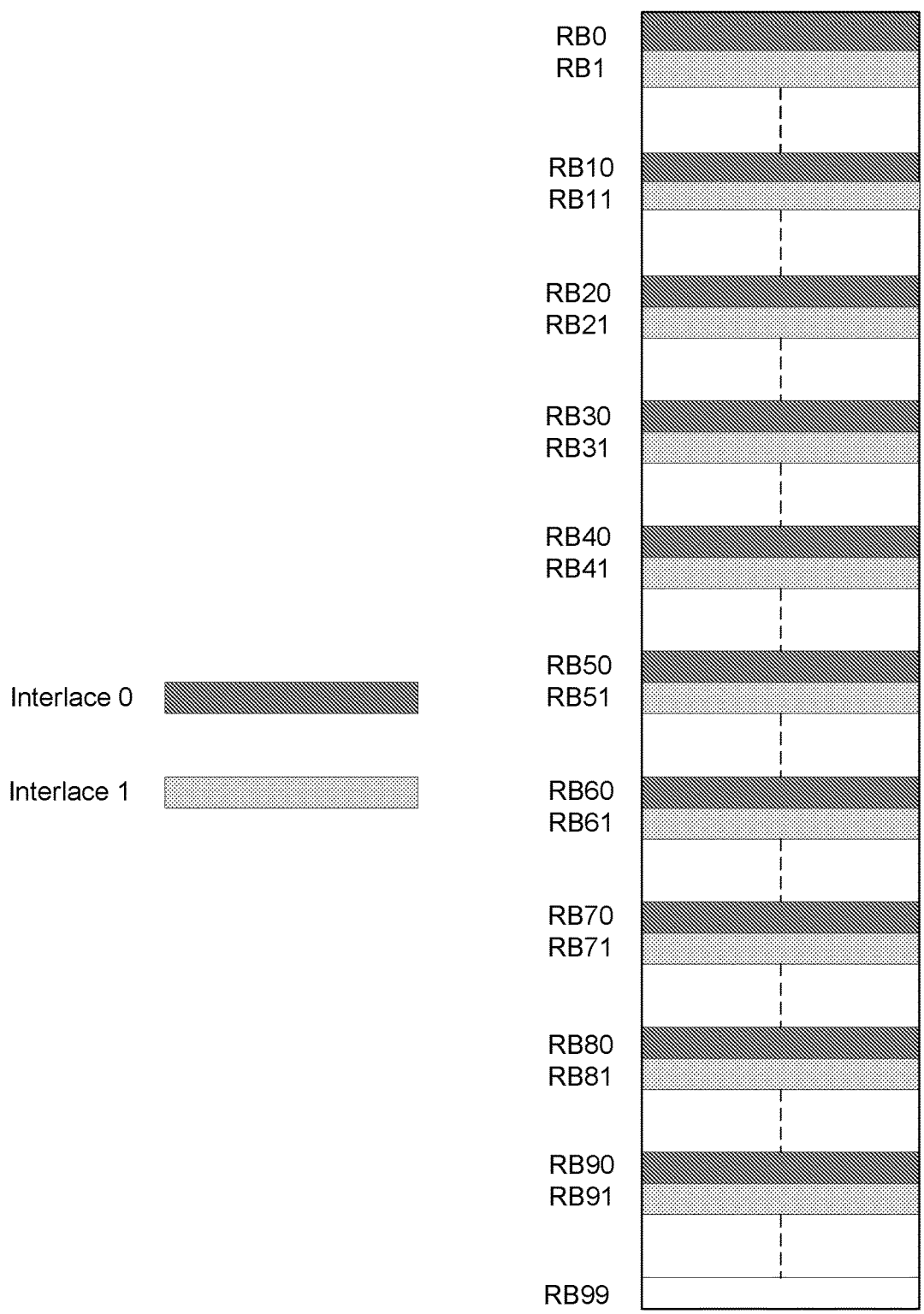
FIG. 2 illustrates example resource allocation interlaces.

Licensed Assisted Access (LAA) and enhanced LAA (eLAA) are features introduced in 3GPP LTE Releases 13 and 14, respectively, to enable interoperability between network infrastructure equipments and user equipments (UEs) with respect to extending long term evolution (LTE) to unlicensed spectrum. LAA enables downlink only operation of LTE in unlicensed bands. eLAA enables both uplink and downlink operation of LTE in unlicensed bands.

eLAA and LTE operation in licensed bands define respective resource allocation frameworks. The resource allocation framework of eLAA may differ from the resource allocation framework of LTE operation in the licensed bands. For example, a basic unit of resource allocation for LTE Unlicensed ("LTE-U") data channels is an interlace; examples of which are shown in FIG. 2. In LAA/eLAA, control channels (e.g., PUCCH) are transmitted using licensed band and hence use the LTE resource allocation framework for licensed bands. The interlace enables network infrastructure equipments and/or UEs to exploit maximum available transmit power and to comply with regulatory requirements (e.g., occupied bandwidth and 10 dBm/MHz requirements) for unlicensed band operation.

In general, an interlace is one of M (e.g., 10) interlaces equally subdividing a bandwidth and includes N (e.g., 120) subcarriers of an OFDM symbol subdivided into P (e.g., 10) clusters of N/P (e.g., 12) subcarriers (i.e., a cluster size of N/P subcarriers), where the P clusters are interleaved with P clusters of each of the other M−1 (e.g., 9) interlaces. For example, as shown in FIG. 2, 10 interlaces subdivide 100 resource blocks, RB0-RB99, where interlace i is allocated RBi, RBi+10 . . . RBi+90, for i=0-9. Assuming each of the resource blocks RB0-RB99 defines 12 subcarriers, RB to RB separation of an interlace is 9×12 subcarriers MulteFire technology differs from LTE-U/LAA/eLAA and/or LTE WLAN aggregation (LWA) in that it operates solely in the unlicensed band. It aims to merge the performance of LTE with the deployment ease of WLAN. In practice, end users install MulteFire access points in lieu of WLAN gateways to provide LTE coverage. Like LAA, MulteFire supports the listen-before-talk (LBT) protocol. Like LTE-U, MulteFire utilizes the interlace structure illustrated in FIG. 1 for different channels, including new PUCCH formats.

A study item of NR-based access to unlicensed spectrum has been approved. The study item will focus on NR numerology on unlicensed spectrum, including sub-6 GHz and above-6 GHz unlicensed bands (e.g., 5 GHz, 37 GHz, 60 GHz). The study should consider scenarios and solutions where NR-LAA is anchored to a legacy LTE carrier by dual-connectivity (DC), as well as CA based aggregation with a 5G NR anchor. Furthermore, it is beneficial to consider standalone operation of NR in unlicensed spectrum at an early stage and the study should address this.

Glossary

A sequence of length N may be represented as $a=(a_k)_{k=0}^{N-1}$ $(a_0, a_1 \ldots, a_{N-1})$. $a_k$ may be a complex number.

Vector notation of a sequence a is given by $a=[a_0, a_1 \ldots, a_{N-1}]^T$ where the elements of the sequence a are laid out as a column vector and where $(\cdot)^T$ is the transpose of its argument.

The operation $(\cdot)^H$ denotes the Hermitian operation.

The operation a+b denoted element-wise summation as $a+b=(a_k+b_k)_{k=0}^{N-1}=(a_0+b_0, a_1+b_1 \ldots, a_{N-1}+b_{N-1})$.

The operation $(\cdot)^*$ gives the conjugate of its argument.

A sequence $\tilde{a}^*$ is a flipped and conjugated sequence of a sequence a, and may be represented as $\tilde{a}^*=(a_{N-1}^*, a_{N-2}^* \ldots, a_0^*)$.

The Kronecker product is denoted by $\otimes$.

$\mathbb{Z}_p^m$ is m dimensional integers with each element $\mathbb{Z}_p$.

Aperiodic Auto Correlation (APAC) of a Sequence: Let $\rho_a(k)$ be the aperiodic autocorrelation of a complex sequence $a=(a_r)_{r=0}^{N-1}=(a_0, a_1 \ldots, a_{N-1})$ and $\rho_a(k)$ is explicitly given by $$\rho_a(k) \triangleq \begin{cases} \rho_a^+(k), & k \geq 0 \\ \rho_a^+(-k)^*, & k < 0 \end{cases} \text{ where} \quad (1)$$

$$\rho_a^+(k) \triangleq \begin{cases} \sum_{i=0}^{N-k-1} a_i^* a_{i+k}, & 0 \leq k \leq N-1 \\ 0, & \text{otherwise} \end{cases} \quad (2)$$

Polynomial Representation of a Sequence: a polynomial representation of a sequence $a=(a_k)_{k=0}^{N-1}=(a_0, a_1 \ldots, a_{N-1})$ may be expressed as: $p_a(Z) \ a_{N-1}z^{N-1}+a_{N-2}z^{N-2}+ \ldots +a_0$. The following interpretations are made by the inventors with respect to the polynomial representation:

$p_a(z^k)$ may correspond to an up-sampled sequence a with the factor of k (for an integer value of k);

$p_a(z^k)p_b(z^l)$ may correspond to a convolution of the up-sampled sequence a with the factor of k and an up-sampled sequence b with the factor of l;

$p_a(z)z^m$ may correspond to the sequence a padded with m null symbols (i.e., zero value symbols) to the beginning;

if $z=e^{j2\pi t}$, then $p_a(z)$ may be equivalent to OFDM signal in time (the frequency domain coefficients are the elements of a where $a_0$ is mapped to a DC tone);

if $z=e^{j2\pi t}$, then the instantaneous power may be calculated as $|p_a(z)|^2$ $p_a(z)p_a^*(z^{-1})$ as $p_a^*(z^{-1})=p_a^*(z)$;

if $z=e^{j2\pi t}$, then $|p_a(z)|^2=p_a(z)p_a^*(z^{-1})$ is related to APAC of the sequence and may be calculated as follows:

$$|p_a(z)|^2|_{z=e^{j2\pi t}} = p_a(z)p_{a^*}(z^{-1})|_{z=e^{j2\pi t}} \quad (3)$$

$$= \rho_a(0) + \sum_{k=1}^{N-1} \rho_a^+(k)z^k + \sum_{k=1}^{N-1} \rho_a^+(k)^* z^{-k}|_{z=e^{j2\pi t}}$$

$$= \rho_a(0) + \sum_{k=1}^{N-1} \rho_a^+(k)e^{j2\pi tk} + \sum_{k=1}^{N-1} \rho_a^+(k)^* e^{-j2\pi tk},$$

$$= \rho_a(0) + 2\sum_{k=1}^{N-1} |\rho_a^+(k)| \cos(2\pi tk + \angle\rho_a^+(k))$$

$$= \sum_{k=-N+1}^{N-1} \rho_a(k)e^{j2\pi tk}$$

if the sequence has a perfect APAC (i.e., $\rho_a(k)=0$ for $k\neq 0$), then:

(i) $|x_a(e^{j2\pi t})|^2=\rho_a(0)$, i.e., $|x_a(e^{j2\pi t})|^2$ becomes a constant function; and/or (ii) the sequences which yield good APAC properties also introduce less fluctuation in time, i.e., low PAPR, when these sequences are used in frequency;

by using the equation above, an upper bound for the PAPR of an OFDM symbol generated through an arbitrary sequence can be obtained as $$PAPR \triangleq \frac{\max(p_a(z)p_{a^*}(z^{-1}))}{E[p_a(z)p_{a^*}(z^{-1})]}\bigg|_{z=e^{j2\pi t}} < \frac{\rho_a(0) + 2\sum_{k=1}^{N-1}|\rho_a^+(k)|}{\rho_a(0)}, \quad (4)$$

where $E[\cdot]$ is the integration operation for t from 0 to 1; and

PAPR may be alternatively measured by two quantities that exploit the APAC of a sequence, namely, integrated sidelobe level (ISL) and merit factor (MF) of a sequence, which are defined as:

$$\text{Integrated sidelobe level } (ISL) \triangleq \sum_{k=1}^{N-1} |\rho_a^+(k)|^2 \text{ and} \quad (5)$$

$$\text{Merit factor } (MF) \triangleq \frac{\rho_a^+(0)^2}{2\sum_{k=1}^{N-1}|\rho_a^+(k)|^2}, \quad (6)$$

respectively.

Algebraic Representation of a Sequence—Generalized Boolean Function:

A generalized Boolean function is a function $f$ that maps from $\mathbb{Z}_2^m = \{(x_1, x_2, \ldots, x_m) x_i \in \{0,1\}\}$ to $\mathbb{Z}_q$ as $$f: \mathbb{Z}_2^m \to \mathbb{Z}_q. \tag{7}$$

A sequence $f=(a_0, a_1, \ldots, a_{2^m-1})$ of length $2^m$ may be associated with the function $f$ by listing the values of $f(x_1, x_2, \ldots, x_m)$ as $(x_1, x_2, \ldots, x_m)$ ranges over its $2^m$ values in lexicographic order. In other words, the (k+1)th element of the sequence $f$ is given by $a_i = f(k_1, k_2, \ldots, k_m)$ where $k = \sum_{i=1}^{m} k_i 2^{m-i}$ (i.e., the most significant bit is $k_1$). By using this association, the distinction between the generalized Boolean function $f$ and the sequence $f$ can be dropped, and a generalized Boolean function $f$ may define (e.g., be used to generate, populate, etc.) a truth table from which the sequence $f$ may be generated. An example of a truth table representation of a generalized Boolean function is shown in FIG. 3 The monomials with the degree of 1 are represented as the sequence $x=(x_1, x_2, \ldots, x_m)$ for the sake of simplifying the notation. In addition, the sequence $x_i$ is defined as the sequence associated with the function of $f(x) = x_i$ and its length is $2^m$.

Algebraic Representation of a Sequence—Entry-Wise Mapping Function:

A sequence generated through a generalized Boolean function may be associated with another sequence by mapping each element of the sequence to the elements in another set via an entry-wise mapping function $\mu$. The entry-wise mapping function may map the elements from $\mathbb{Z}_q$ to $\mathbb{S}$ as $$\mu: \mathbb{Z}_q \to \mathbb{S}. \tag{8}$$

Figure 4:
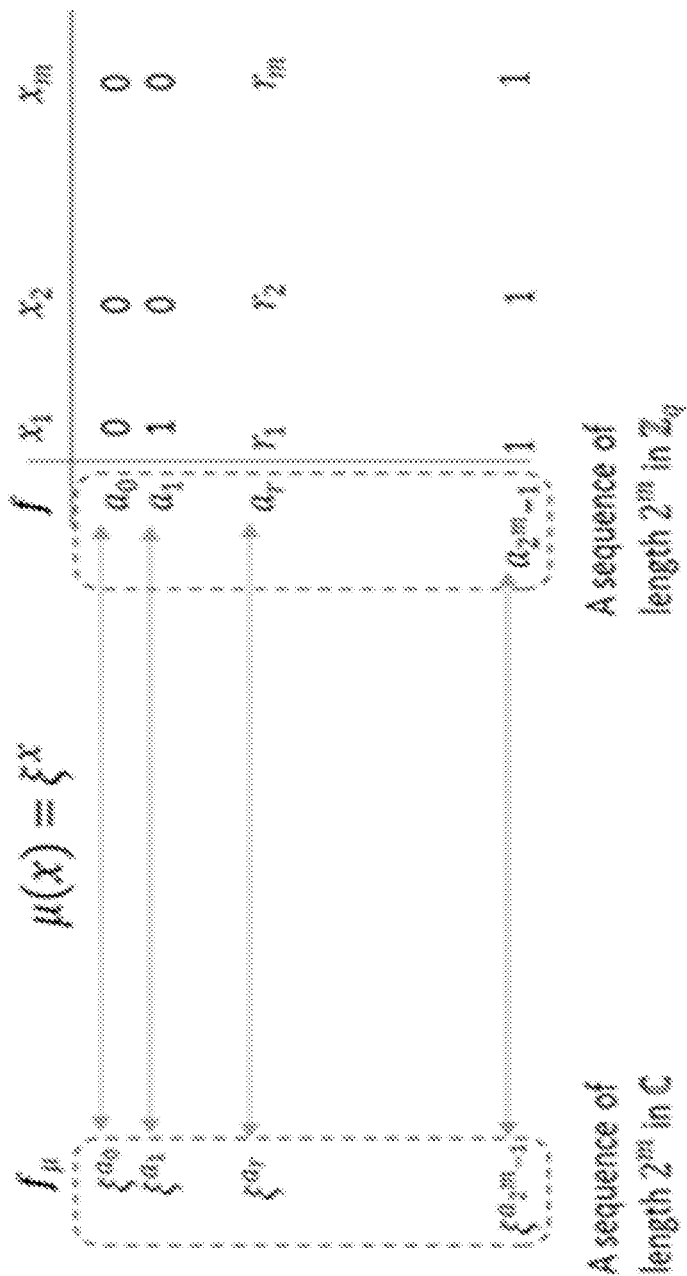
FIG. 4 illustrates an example entry-wise mapping function.

For example, if $\mu(x) = \xi^x \in \mathbb{S}\{\xi^0, \xi^1, \ldots, \xi^{q-1}\}$ where $$\xi = e^{\frac{i2\pi}{q}},$$

then the associated sequence may be $\mu(f) = (\xi^{a_0}, \xi^{a_1}, \ldots, \xi^{a_{2^m-1}})$ where $\mu(f)$ yields a q-PSK sequence. An example mapping generated from such entry-wise mapping function is shown in FIG. 4. As another example, if $\mu(a) = ax^T$, then the associated sequence $\mu(f)$ is given by $\mu(f) = (a_0 a^T, a_1 a^T, \ldots, a_{2^m-1} a^T)$. The entry-wise mapping function may be an injective or bijective function.

Algebraic Normal Form (ANF):

A generalized Boolean function may be uniquely expressed as a linear combination over $\mathbb{Z}_q$ of the monomials as $$f(x_1, x_2, \ldots, x_m) = \tag{9}$$

$$\sum_{k=0}^{2^m-1} c_i \underbrace{\prod_{i=1}^{m} x_i^{k_i}}_{ith\ monomial} = c_0 1 + c_1 x_1 + c_2 x_2 + \ldots + c_{m+1} x_1 x_2 + \ldots$$

where the coefficient of each monomial belongs to $\mathbb{Z}_q$ i.e., $c_i \in \mathbb{Z}_q$ and $k = \sum_{j=1}^{m} k_j 2^{m-j}$. The monomials, e.g., 1, $x_1$, $x_2$, $x_1 x_2, \ldots, x_1 x_2 \ldots x_m$ are linearly independent. The linear independency may be proven by using the definition of linearly independence, i.e., $\Sigma_i a_i x_i = 0$ if and only if $a_i = 0$ for all x.

All the possible monomials construct a basis for the generalized Boolean functions. Since there are $2^m$ monomials for a given m, there are $q^{2^m}$ different generalized Boolean functions, each of which is a mapping $\mathbb{Z}_2^m \to \mathbb{Z}_q$. For example, if q=4, m=1, there are 16 different generalized Boolean functions, i.e., $f(x) = c_0 1 + c_1 x_1$, $c_{i = \{0,1\}} \in \mathbb{Z}_4$, which means that there 16 different sequences of length $2^m = 2$ where the elements are in the set of $\{0,1,2,3\}$.

Golay Complementary Pair and Complementary Sequence:

The pair of (a, b) is a Golay complementary pair (GCP) if $\rho_a(k) + \rho_b(k) = 0$, $k \neq 0$, and a sequence $a = (a_0, a_1, \ldots, a_{N-1})$ is a complementary sequence (CS) if there is another sequence $b = (b_0, b_1, \ldots, b_{N-1})$ which complements a as $\rho_a(k) + \rho_b(k) = 0$, $k \neq 0$.

The PAPR of an OFDM signal generated using a CS can be less than 3 dB. Since a GCP of a and b satisfies $\rho_a(k) + \rho_b(k) = 0$, $k \neq 0$, then $$x_a(z) x_{a^*}(z^{-1}) + x_b(z) x_{b^*}(z^{-1}) = \tag{10}$$

$$\rho_a(0) + \sum_{k=1}^{N-1} \rho_a^+(k) z^k + \rho_a^-(k) z^{-k} + \rho_b(0) + \sum_{k=1}^{N-1} \rho_b^+(k) z^k + \rho_b^-(k) z^{-k} =$$

$$\rho_a(0) + \rho_b(0) + \sum_{k=1}^{N-1} ((\rho_a^+(k) + \rho_b^+(k)) z^k + (\rho_a^-(k) + \rho_b^-(k)) z^{-k}) =$$

$$\rho_a(0) + \rho_b(0)$$

and the PAPR of a Golay sequence may be bounded as $$\left. \frac{\max(|x_a(z)|^2)}{E[|x_a(z)|^2]} \right|_{z = e^{j2\pi t}} = \tag{11}$$

$$\frac{\max(x_a(z) x_{a^*}(z^{-1}))}{E[x_a(z) x_{a^*}(z^{-1})]} < \frac{\max(x_a(z) x_{a^*}(z^{-1}) + x_b(z) x_{b^*}(z^{-1}))}{E[x_a(z) x_{a^*}(z^{-1})]} =$$

$$\frac{\rho_a(0) + \rho_b(0)}{\rho_a(0)} = 2$$

when $\rho_a(0) = N$. For a large alphabet, $\rho_a(0)$ may be different than N. However, the average of $\rho_a(0)$ and $\rho_b(0)$ remains equal to N.

CSs with the alphabet of $\{1, -1\}$ exist for all lengths $N = 2^n 10^m 26^k$ for any non-negative integers n, m and k. The use of GCPs and CS may be particularly suited for any of peak-to-average power mitigation, estimation of IQ imbalance parameters and channel estimation.

Unified Methods to Construct Golay Complementary Pair—Property 1:

Let a and b be Golay pairs of length N and c and d be Golay pairs of length M. Then, the sequences e and $f$ are Golay pairs of length k(N−1)+(M−1)+m+1:

$$x_e(z) = \alpha_1 w_1 w_3 x_a(z^k) x_c(z^l) + \alpha_1 w_2 w_4 x_b(z^k) x_d(z^l) z^m \tag{12}$$

$$x_f(z) = \alpha_1 w_1 w_4 * x_{b^*}(z^k) x_c(z^l) - \alpha_1 w_2 w_3 * x_{a^*}(z^k) x_d(z^l) z^m \tag{13}$$

where k, l, m are real numbers, $w_1$, $w_2$, $w_3$, and $w_4$ are arbitrary complex numbers with unit amplitude, and $\alpha_1$ is a complex number.

Unified Methods to Construct Golay Complementary Pair—Property 2:

Let a and b be Golay pairs of length N. Then, the following e and $f$ sequences are Golay pairs of length k(N−1)+m+1:

$$x_e(z) = \alpha_1 w_1 w_3 x_a(z^k) + \alpha_2 w_2 w_4 x_b(z^k) z^m \tag{14}$$

$$x_f(z) = \alpha_2 w_1 w_4 x_a(z^k) - \alpha_1 w_2 w_3 b(z^k) z^m \tag{15}$$

where k, m are real numbers, $w_1$ and $w_2$ are arbitrary complex numbers with unit amplitude and $\angle\alpha_1 = \angle\alpha_2 = 1$.

Unified Methods to Construct Golay Complementary Pair—Property 3:

Let a and b be Golay pairs of length N. Then, the following e and f sequences are Golay pairs of length k(N−1)+m+1:

$$x_e(z) = \alpha_1 w_1 w_3 x_a(z^k) + \alpha_2 w_2 w_4 x_b(z^k) z^m \quad (16)$$

$$x_f(z) = \alpha_2 w_1 w_4^* x_{\tilde{b}^*}(z^k) - \alpha_1 w_2 w_3 x_{\tilde{a}}^*(z^k) z^m \quad (17)$$

where k, m are real numbers, $w_1$ and $w_2$ are arbitrary complex numbers with unit amplitude and $\angle\alpha_1 = \varphi\alpha_2 = 1$.

Recursive Golay Complementary Pair Construction Methods—Golay's Concatenation-Based Method 1:

Let a and b be a GCP of length N. Then, the sequences e and f construct a GCP of length of 2N $$x_e(z) = x_a(z) + x_b(z) z^N \quad (18)$$

$$x_f(z) = x_a(z) - x_b(z) z^N \quad (19)$$

Note that this is a special case of Property 2 where $\alpha_{1,2} = w_{1,2,3,4} = 1$, k=l=1, m=N.

Recursive Golay Complementary Pair Construction Methods—Golay's Concatenation-Based Method 2:

Let a and b be a GCP of length N. Then, the sequences e and f construct a GCP of length of 2N $$x_e(z) = x_a(z) + x_b(z) z^N \quad (20)$$

$$x_f(z) = x_{\tilde{b}^*}(z) - x_{\tilde{a}^*}(z) z^N \quad (21)$$

Note that this is a special case of Property 3 where $\alpha_{1,2} = w_{1,2,3,4} = 1$, k=l=1, m=N.

Recursive Golay Complementary Pair Construction Methods—Golay's Interleaving-Based Method 1:

Let a and b be a GCP of length N. Then, the sequences e and f construct a GCP of length of 2N $$x_e(z) = x_a(z^2) + x_b(z^2) z \quad (22)$$

$$x_f(z) = x_a(z^2) - x_b(z^2) z \quad (23)$$

Note that this is a special case of Property 2 where $\alpha_{1,2} = w_{1,2,3,4} = 1$, k=l=2, m=1.

Recursive Golay Complementary Pair Construction Methods—Golay's Interleaving-Based Method 2:

Let a and b be a GCP of length N. Then, the sequences e and f construct a GCP of length of 2N $$x_e(z) = x_a(z^2) + x_b(z^2) z \quad (24)$$

$$x_f(z) = x_{\tilde{b}^*}(z^2) + x_{\tilde{a}^*}(z^2) z \quad (25)$$

Note that this is a special case of Property 3 where $\alpha_{1,2} = w_{1,2,3,4} = 1$, k=l=, m=1.

Recursive Golay Complementary Pair Construction Methods—Sivaswamy's Construction:

Let $c_0$ and $d_0$ be Golay pairs of length M. The length $2^n$ M GCPs can be constructed by the following recursive procedure:

$$x_{c_{(n)}}(z) = x_{c_{(n-1)}}(z) + w_{n-1} x_{d_{(n-1)}}(z) z^{2^{n-1}M} \quad (26)$$

$$x_{d_{(n)}}(z) = x_{c_{(n-1)}}(z) - w_{n-1} x_{d_{(n-1)}}(z) z^{2^{n-1}M} \quad (27)$$

where $|w_n|=1$.

Note that this is a special case of Property 2 where $\alpha_{1,2} = w_{1,3,4} = 1$, $w_2 = w_n$, k=l=1, $m=M2^n$. This construction concatenates the CSs at each iteration.

Recursive Golay Complementary Pair Construction Methods—Budisin's Construction:

Let $c_0$ and $d_0$ be Golay pairs of length M. The length $2^m$ M GCPs can be constructed by the following recursive procedure:

$$x_{c_{(n)}}(z) = x_{c_{(n-1)}}(z) + w_n x_{d_{(n-1)}}(z) z^{2^{p_{(n-1)}}M} \quad (28)$$

$$x_{d_{(n)}}(z) = x_{c_{(n-1)}}(z) - w_n x_{d_{(n-1)}}(z) z^{2^{p_{(n-1)}}M} \quad (29)$$

where $|w_n|=1$, $p_n$ is (n+1)th element of the permutation of {0 1 2 ... m−1}.

Note that this is a special case of Property 2 where $\alpha_{1,2} = w_{1,3,4} = 1$, $w_2 = w_n$, k=l=1, $m=M2^{p_n}$. As compared to Sivaswamy's construction, Budisin's method concatenates the CSs by allowing different ordering at the mth iteration.

Recursive Golay Complementary Pair Construction Methods—Turyn's Method:

Let a and b be a GCP of length N and c' and d' be Golay pairs of length M. Then, the sequences e and f are Golay pairs of length MN:

$$x_e(z) = x_a(z^M) \tfrac{1}{2}(x_c(z) + x_d(z)) + x_b(z^M) \tfrac{1}{2}(x_c(z) - x_d(z)) \quad (30)$$

$$x_f(z) = x_{\tilde{b}^*}(z^M) \tfrac{1}{2}(x_c(z) + x_d(z)) - x_{\tilde{a}^*}(z^M) \tfrac{1}{2}(x_c(z) - x_d(z)) \quad (31)$$

Turyn's method does not change the alphabet for the element of the sequences if the original alphabet for a, b, c', and d' is {1, −1} and the sequences c' and d are summed or subtracted.

Note that this is a special case of Property 1 where $\alpha_1 =$, $w_{1,2,3,4} = 1$, k=M, l=1, m=0, $x_c(z) = (x_c(z) + x_d(z))$, and $x_d(z) = (x_c(z) - x_d(z))$. The sequences c and d construct a GCP based on Property 2.

Algebraic Golay Complementary Pair Construction Methods—Davis & Jedwab's Construction:

Theorem (GCS): Let f be a function as $f: \mathbb{Z}_2^m \to \mathbb{Z}_q$ given by $$f(x_1, x_2, \ldots, x_m) = 2^{h-1} \Sigma_{k=1}^{m-1} x_{\pi(k)} x_{\pi(k+1)} + \Sigma_{k=1}^m c_k x_k \quad (32)$$

where $c_i \in \mathbb{Z}_{2^h}$ and $\pi$ is a permutation of the indices {1, 2, ..., m}. Then, the sequence pair (a, b) defined by $$a = \mu(f+c) \quad (33)$$

$$b = \mu(f + 2^{h-1} x_{\pi(1)} + c') \quad (34)$$

are GCP of length of $2^m$ for any c, c' ∈ $\mathbb{Z}_{2^h}$ and the entry-wise function $\mu(x) = \xi^x$ where $$\xi = e^{j\frac{2\pi}{2^h}}.$$

Algebraic Golay Complementary Pair Construction Methods—Kenneth's Construction:

Theorem: Let f be a function as $f: \mathbb{Z}_2^m \to \mathbb{Z}_H$ given by $$f(x_1, x_2, \ldots, x_m) = H/2 \Sigma_{k=1}^{m-1} x_{\pi(k)} x_{\pi(k+1)} + \Sigma_{k=1}^m c_k x_k \quad (35)$$

where $c_i \in \mathbb{Z}_H$ and $\pi$ is a permutation of the indices $\{1, 2, \ldots, m\}$. Then, the sequence pair (a, b) defined by $$a = \mu(f + c) \tag{36}$$

$$b = \mu\left(f + \frac{H_p}{2}x_{\pi(1)} + c'\right) \tag{37}$$

are GCP of length of $2^m$ for any $c, c' \in \mathbb{Z}_{H_p}$ and the entry-wise function $\mu(x) = \xi^x$ where $$\xi = e^{j\frac{2\pi}{H}}$$

and H is an even positive integer.

Figure 5:
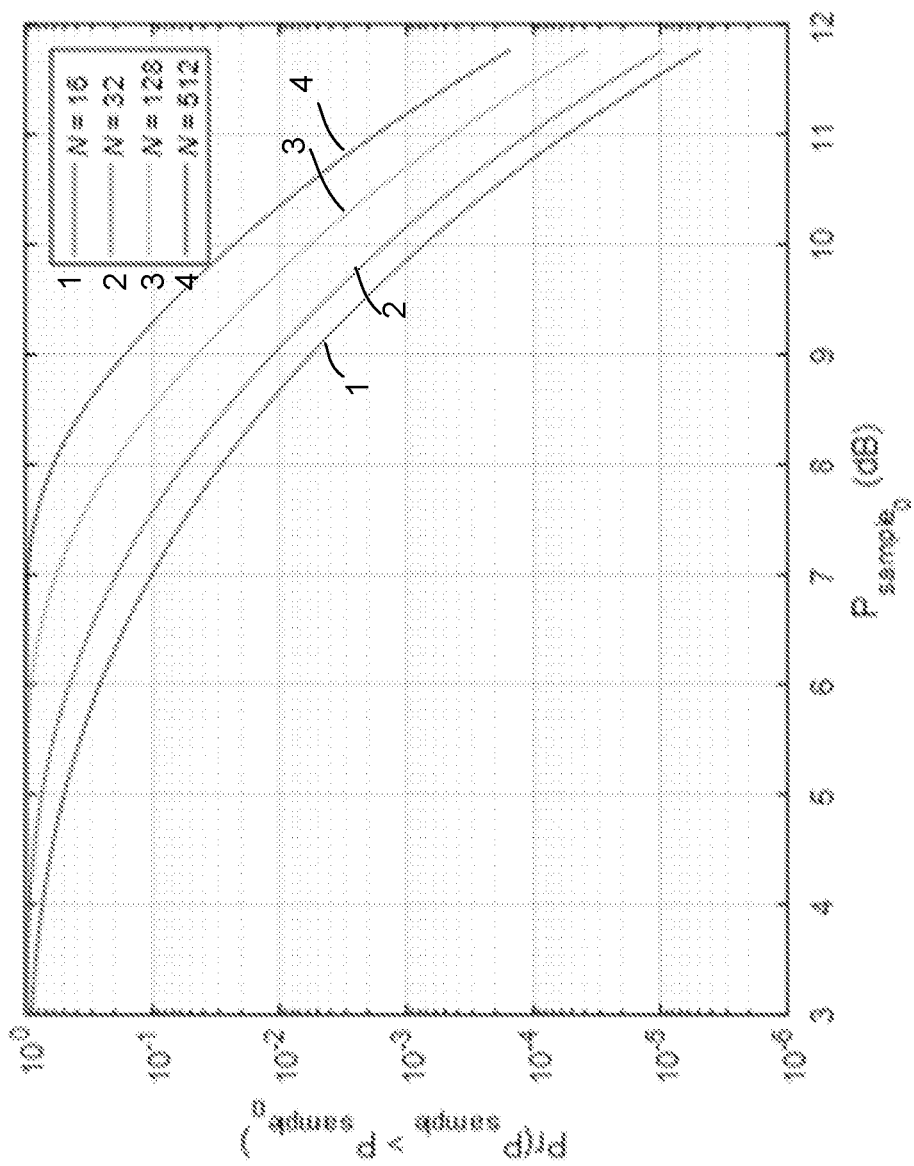
FIG. 5 is a graph illustrating a peak-to-average power ratio (PAPR) distribution for frequency division multiplexing (OFDM) signals.

Referring now to FIG. 5, a graph illustrating a peak-to-average power ratio (PAPR) distribution for frequency division multiplexing (OFDM) signals under a Gaussian distribution approximation is shown. From the central-limit theorem, the sample distribution of a orthogonal frequency division multiplexing (OFDM) waveform can be similar to a Gaussian distribution as a large number of modulated, different subcarriers are linearly combined via a Fourier transformation. By assuming N independent and identically distributed (i.i.d.) samples in time (i.e., no oversampling) and normalized sample power, the complementary cumulative distribution function (CCDF) of the sample power can be given by $$Pr(P_{sample} > P_{sample_0}) = 1 - \left(1 - e^{-P_{sample_0}}\right)^N. \tag{38}$$

As shown in FIG. 5, instantaneous sample power within an OFDM symbol can be significantly higher than average symbol power. For example, in an OFDM symbol having 128 active subcarriers, approximately 10 percent of the samples are 8.5 dB above than average sample power and 50 percent of the time, the sample power is 7 dB above the average symbol power. A consequence of the instantaneous sample power within an OFDM symbol being significantly higher than average symbol power is that OFDM signals generated using non-linear hardware, such as a power amplifier of a transmitter, are prone to distortion. To avoid distortion, a power back-off may be applied at the transmitter. However, this reduces coverage of the signals.

One solution considered in several wireless communications standards is to use single-carrier-like schemes such as SC-QAM (as in IEEE 802.11ad/ay) and DFT-spread OFDM (as in 3GPP LTE/NR uplink). However, these schemes only allow contiguous resource allocation in frequency and do not yield flexible non-contiguous allocation without affecting the PAPR. On the other hand, for several reasons, a non-contiguous resource allocation in frequency domain may be needed. For example, spectrum regulations in unlicensed band can introduce power spectral density (PSD) limitations (e.g., 10 dBm/MHz). To increase the signal power under PSD restrictions, the signal energy may need to be distributed in frequency. However, this may cause excessive utilization of frequency-domain resources, which may cause issues in multi-user scenarios. Interlaced resource allocation may be used to avoid such issues. Similarly, non-contiguous resource allocations may be used to increase reliability of signals for, e.g., low-latency applications such as ultra-reliable low-latency communications (URLLC) signals and wake-up signals. Controlling instantaneous peak power of the transmitted signals over interlaced resource allocations and non-contiguous resource allocation is not trivial.

Representative Reliable Signals with Interlaced Resource Allocation

In 3GPP 5G New Radio (NR) Unlicensed ("NR-U"), a PUCCH may be transmitted over the unlicensed carrier for standalone operation. Since PUCCH may be transmitted within a period of short duration, the symbols may be transmitted with high power e.g., to enhance demodulation performance. Hence, the design for PUCCH in unlicensed band should lead to the signals with low PAPR. Construct sequences with low PAPR is challenging when considering a interlace structure that allows high transmit power (e.g., higher than licensed band operation) without violating regulatory requirements.

Figure 6:
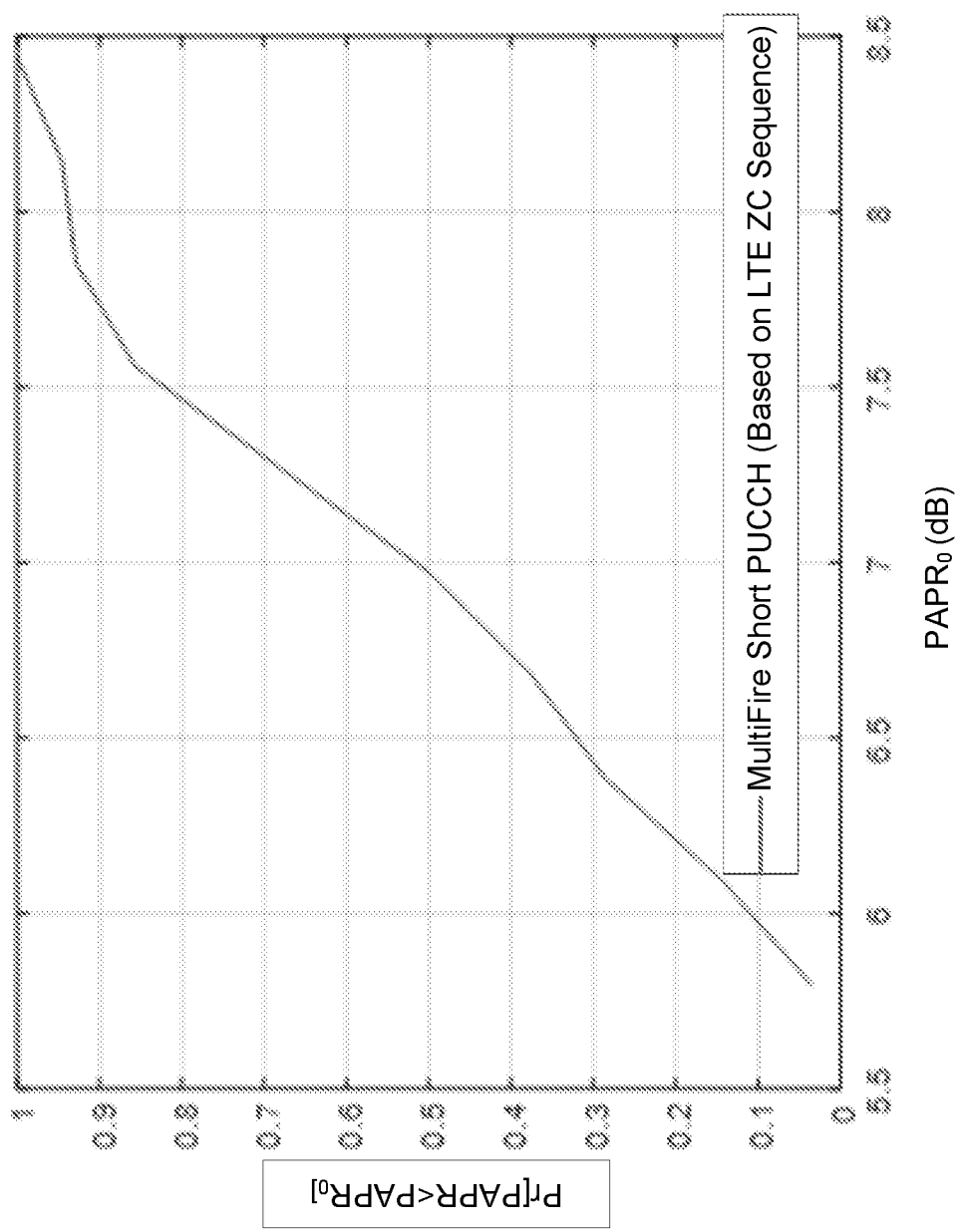
FIG. 6 is a graph illustrating a peak-to-average power ratio (PAPR) distribution for sPUCCH Format 0 in Multe-Fire.

FIG. 6 is a graph illustrating a PAPR distribution for sPUCCH Format 0 in MulteFire. In MulteFire, "sPUCCH Format 0" follows the same interlace structure as LTE-U for scheduling request by using a cyclically-padded Zadoff-Chu sequence. As shown in FIG. 6, the PAPR is more than 5.5 dB, i.e., not optimal in terms of PAPR, and the corresponding sequence may detrimentally increase complexity at receiver due to its polyphase nature (the elements of the sequence are arbitrary complex numbers with unit amplitude).

What is needed is a constructive method for PUCCH in which 1) PAPR of the symbols in PUCCH may be controlled in consideration of an interlaced structure of the waveforms in the unlicensed band, and 2) receiver complexity may be minimized, e.g., by limiting the sequence alphabet, e.g., QPSK constellation.

Representative Ultra-Reliable and Low-Latency Waveform

To enable ultra-reliable and low-latency communications, the waveform should be immune against hardware non-linearity and fading in communications channels. One way of achieving reliability is to use enhanced coding structures, such as polar codes, and to exploit frequency diversity by using non-contiguous resources allocations. Designing a waveform that has low cubic metric (CM)/PAPR while exploiting enhanced coding schemes and allowing non-contiguous allocations is challenging. The amount of power back-off may cause significant amount of power loss and decrease the effectiveness of such scheme.

In some cases, it may be desirable to support large payloads (e.g., virtual reality, remote surgery applications). However, the waveforms such as DFT-spread OFDM or SC-QAM lose their PAPR advantage for higher order modulations. Hence, flexible structures which can support both various payloads and enables high modulation orders is needed for URLCC waveforms.

Overview

Methods, apparatuses and systems directed to complementary sequence (CS) encoding and encoded CS transmissions are provided. Among the apparatuses is a transmitter having a complementary sequence (CS) encoder that may limit peak-to-average-power ratio (PAPR) of an orthogonal frequency division multiplexing (OFDM) symbol for a contiguous or a non-contiguous frequency domain resource allocation. In an embodiment, the CS encoder may convert a set of initial (e.g., Golay) complementary sequence pairs to an encoded CS (e.g., Golay) sequence, and the transmitter may transmit the encoded CS sequence (codeword) via an OFDM waveform, which may exhibit a low PAPR (e.g., below 3 dB) for the contiguous or non-contiguous frequency domain resource allocation. In an embodiment, the encoder may include an order encoder, a phase encoder, and a shift encoder along with a synthesizer to perform various encodings.

Provided herein is a framework that describes a recursion evolved with two linear operators at each operation as an encoding operation. The framework may algebraically determine how operators applied at each recursion operation may be distributed to coefficients of a polynomial via binary construction sequences. By applying the framework to a recursive Golay complementary pair (GCP) construction relying on Budisin's methods, the impact of initial sequences, phase rotations, signs, real scalars, and shifting factors applied at each operation on the elements of the sequences in a GCP are shown. An encoder is provided that may generates non-contiguous CSs, i.e., CSs with zero symbols, by deriving algebraic normal forms (ANFs) for the shifting factors. Pursuant to the methods, apparatuses and systems provided herein, frequency diversity, coding gain, and low PAPR, may be achieved simultaneously for OFDM symbols. Also pursuant to the methods, apparatuses and systems provided herein, standard sequences may be extended by separating encoders that control amplitude and phase of the elements of a CSs. Also provided herein is an encoder that generates CSs with quadrature amplitude modulation (QAM) alphabet.

Among the apparatuses is apparatus having a transmitter that may be configured to (i) transmit an encoded complementary sequence (CS) via a block based, e.g., orthogonal frequency division multiplexing (OFDM), waveform, and/or (ii) construct or otherwise generate ("collectively "generate") the encoded CS using a plurality of seed sequences and a plurality of information items, wherein (or such that): (a) juxtaposition of the elements of the encoded CS ("encoded-CS elements") encodes a first set of the plurality of information items ("first information-item set"); (b) phases of the encoded-CS elements encode a second set of the plurality of information items ("second information-item set"); and (c) the encoded-CS elements define a number of zeros that encode a third set of the plurality of information items ("third information-item set"). In an embodiment, the encoded-CS elements may define respective numbers of zeros that collectively form the number of zeros that encode the third information-item set. In an embodiment, each encoded-CS element may define a number of zeros that do not contribute to the number of zeros that encode the third information-item set.

In an embodiment, the transmitter may include circuitry, including a processor and memory, configured to implement a complementary sequence (CS) encoder (CSE) entity and an inverse discrete Fourier transform (IDFT) entity. The CSE entity may be configured to, and may, generate the encoded CS in a frequency domain. The IDFT entity may be configured to, and may, apply an IDFT to convert the encoded CS to a time domain.

In an embodiment, the amplitudes of the elements of the encoded complementary sequence may encode a fourth set of the plurality of information items.

Among the apparatuses is apparatus having a transmitter that may be configured to (i) generate a first encoded sequence using a plurality of seed sequences and a first set of a plurality of information items, wherein juxtaposition of the elements of the first encoded sequence corresponding to different seed sequences encode the first set of the plurality of information items; (ii) generate a second encoded sequence using the first encoded sequence and a second set of the plurality of information items, wherein phases of the elements of the second encoded sequence encode the second set of the plurality of information items; (iii) generate a third encoded sequence using the second encoded sequence and a third set of the plurality of information items, wherein the elements of the third encoded sequence define a number of zeros that encode a third set of the plurality of information items; and (iv) generate an encoded complementary sequence as a function of the third encoded sequence.

Among the apparatuses is apparatus having a transmitter that may be configured to (i) generate a first encoded sequence using a plurality of seed sequences and a first set of a plurality of information items, wherein juxtaposition of the elements of the first encoded sequence corresponding to different seed sequences encode the first set of the plurality of information items; (ii) generate a second encoded sequence using the first encoded sequence and a second set of the plurality of information items, wherein amplitudes of the elements of the second encoded sequence encode the second set of the plurality of information items; (iii) generate a third encoded sequence using the second encoded sequence and a third set of the plurality of information items, wherein phases of the elements of the third encoded sequence encode the third set of the plurality of information items; (iv) generate a fourth encoded sequence using the third encoded sequence and a fourth set of a plurality of information items, wherein the elements of the third encoded sequence define a number of zeros that encode a third set of the plurality of information items; and (v) generate an encoded complementary sequence as a function of the fourth encoded sequence.

Among the apparatuses is apparatus having a transmitter that may be configured to (i) perform order encoding to generate a first encoded sequence at least in part by juxtapositioning elements of a plurality of seed sequences based on a first set of a plurality of information items; (ii) perform phase encoding to generate a second encoded sequence at least in part by phase rotating elements of the first encoded sequence based on a second set of the plurality of information items; (iii) perform shift encoding to generate a third encoded sequence at least in part by shifting (e.g., zero padding) elements of the second encoded sequence based on a third set of the plurality of information items and a resource allocation; and (iv) generate an encoded complementary sequence as a function (e.g., summation of individual elements) of the third encoded sequence.

Among the apparatuses is apparatus having a transmitter that may be configured to (i) perform order encoding to generate a first encoded sequence at least in part by juxtapositioning elements of a plurality of seed sequences based on a first set of a plurality of information items; (ii) perform amplitude encoding to generate a second encoded sequence at least in part by adjusting at least one amplitude of at least one element of the first encoded sequence based on a second set of the plurality of information items; (iii) perform phase encoding to generate a third encoded sequence at least in part by phase rotating elements of the second encoded sequence based on a third set of the plurality of information items; (iv) perform shift encoding to generate a fourth encoded sequence at least in part by shifting (e.g., zero padding) elements of the third encoded sequence based on a fourth set of the plurality of information items and a resource allocation; and (v) generate an encoded complementary sequence as a function (e.g., summation of individual elements) of the fourth encoded sequence.

Pursuant to the methods, apparatuses and systems, an OFDM signal generated using the encoded CS may have a low peak-to-average power ratio (PAPR), such as, for example, less than or equal to 3 dB. Also pursuant to the methods, apparatuses and systems, both contiguous and non-contiguous allocations may be supported. Further pursuant the to the methods, apparatuses and systems distinct channel encoding, modulation and resource allocation procedures need not be carried out for generating an OFDM waveform.

Considering interlaced resource allocation to meet channel occupation requirement and increase the signal power for unlicensed bands and the several use cases such as URLLC in licensed band, the methods, apparatuses and systems may be suitable for various applications in both licensed and unlicensed bands.

Representative Transmitter Architectures

Figure 7:
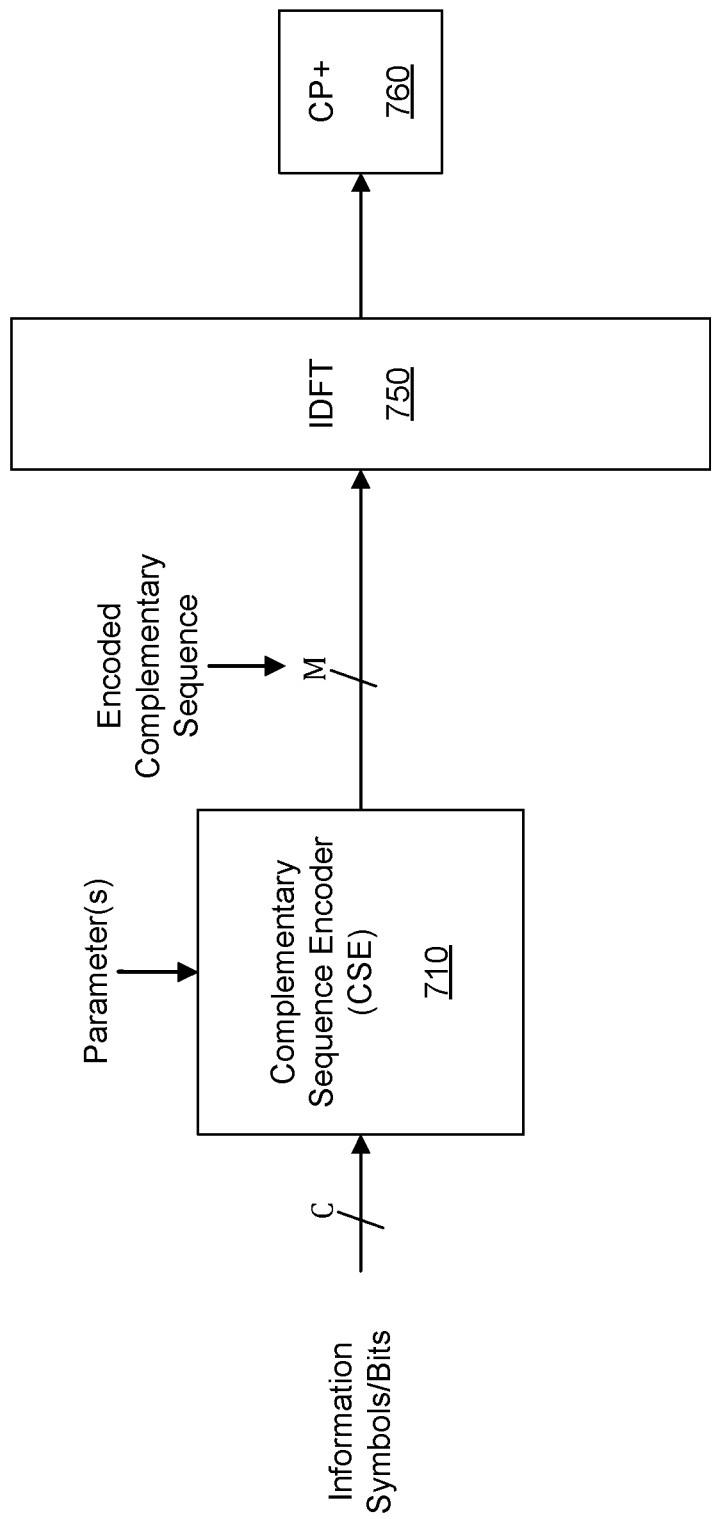
FIG. 7 is a block diagram illustrating an example transmitter in which one or more embodiments may be implemented.

FIG. 7 is a block diagram illustrating an example transmitter 700 in which one or more embodiments may be implemented. The transmitter 700 may include a complementary sequence (CS) encoder (CSE) entity 710, an IDFT entity 750, and a cyclic prefix appending (CP+) entity 760. The transmitter 700 may include other entities, as well. The CSE entity 740 may be communicatively coupled with the IDFT entity 750, which may be communicatively coupled with the CP+ entity 760. The transmitter 700 may be implemented in any of a WTRU and a base station (or one or more other network elements). Solely for convenience, the following description assumes the transmitter 700 is implemented in a WTRU. The WTRU may include circuitry, including a processor and memory, configured to implement the transmitter and/or the various entities thereof.

The CSE entity 710 may include one or more inputs ("CSE inputs"), one or more processing entities ("CSE processing entities") and one or more outputs ("CSE outputs"). The CSE inputs may receive a set of information symbols (e.g., C information bits) and one or more parameters.

The CSE processing entities may generate an encoded CS based on any of the information symbols and the parameters. The encoded CS may have a length of M elements, as shown. The parameters may include fixed values, system parameters, etc. As an example, the parameters may be any of a modulation order, a resource allocation and the number of information symbols/bits. The modulation order may be, for example, M-PSK or M-QAM. The resource allocation may be, for example, non-contiguous or contiguous. A non-contiguous resource allocation may result in the encoded CS having elements whose values may be zero or other null value, for example.

The outputs of the CSE entity 710 may output the encoded CS. The IDFT entity 750 may receive the encoded CS. The IDFT entity may process the encoded CS into a time domain signal and may output the time domain signal. The CP+ entity 760 may receive the time domain signal, append a cyclic prefix and output the modified time domain signal for further processing. The further processing may be carried out by one or more of the other transmitter entities (not shown). The further processing may include, for example, processing the modified time domain signal into a block based (e.g., OFDM) signal and/or transmitting the block-based signal.

The CSE processing entities may include various encoders to encode the set of information symbols/bits. The CSE processing entities may map a subset of the set information symbols/bits to each of the various encoders, and each of the various encoders may separately encode the subsets of information symbols/bits mapped to it. The subsets may, but need not, be mutually exclusive.

For sake of simplicity herein supra and infra, the set of information symbols is assumed to be a single set of information symbols with each of the subsets being a subset of the single set of information symbols. One of ordinary skill in the art will recognize that CSE element may receive a plurality of sets of information symbols, and the CSE processing elements may map one of the plurality of sets of information symbols to each of the various encoders. Alternatively, the CSE processing elements may map to the various encoders respective sets of information symbols; each of which may have information symbols from one or a combination of the plurality of sets of information symbols.

The CSE processing entities need not perform distinct channel encoding, modulation, and resource-allocation assignment procedures. The channel encoding, modulation, and resource-allocation assignment of the encoded CS may result from joint (collective) operations carried out by the CSE processing entities.

The encoded CS may be one of a plurality of possible unique encoded CS that can be generated using the received set of information; allowing the encoded CS to operate as a complex codeword. The ability of the CSE entity 710 to generate a plurality of possible unique encoded CS using the received (or a given) set of information may obviate functionality and/or associated structure elements in the CSE entity 710 and/or transmitter 700 for uniquely coding the encoded CS post generation.

Figure 8:
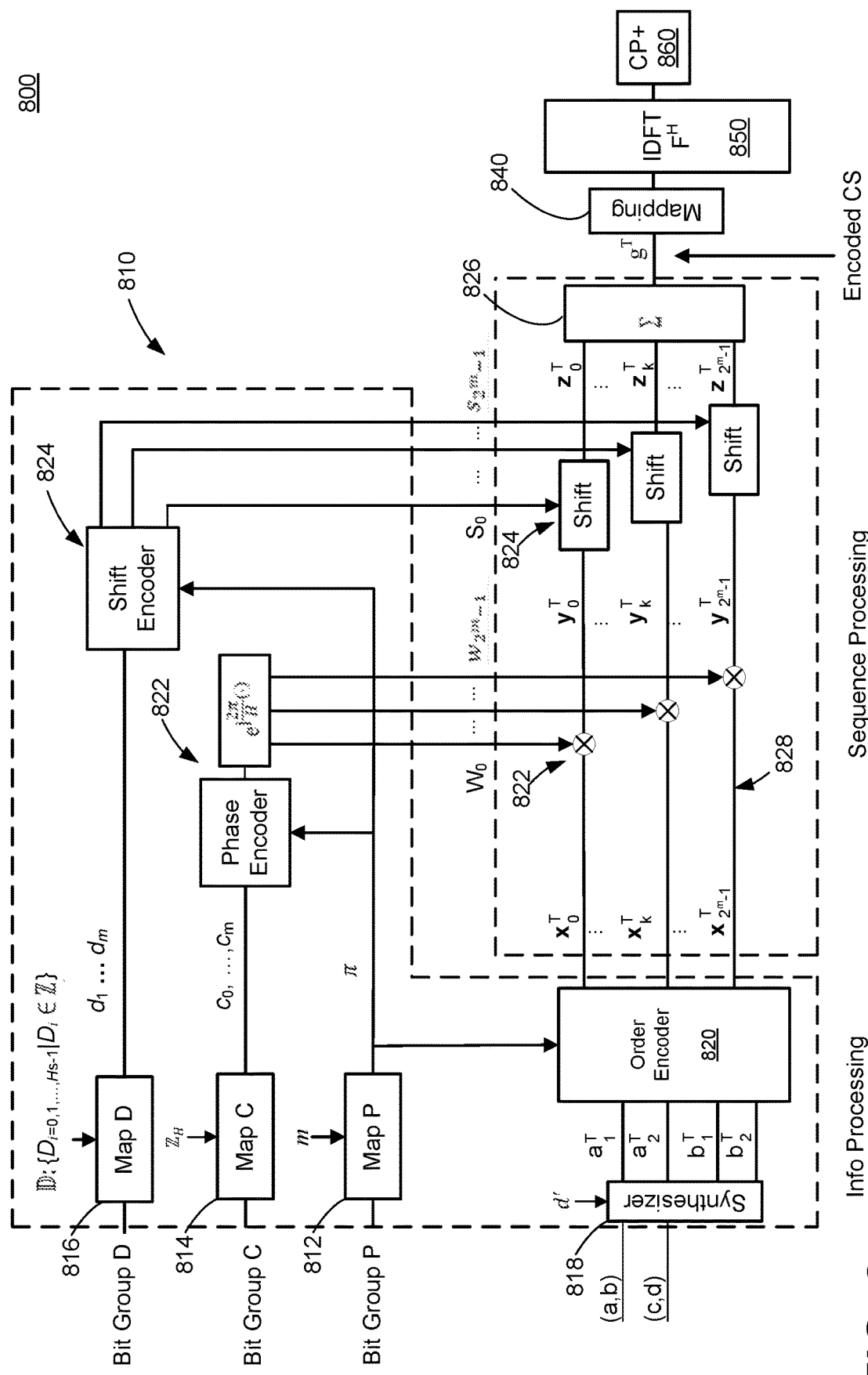
FIG. 8 is a block diagram illustrating an example transmitter in which one or more embodiments may be implemented.

FIG. 8 is a block diagram illustrating an example transmitter 800 in which one or more embodiments may be implemented. The transmitter 800 may include a CSE entity 810, a mapping entity 840, an IDFT entity 850, and a CP+ entity 860. The CSE entity 810 may be communicatively coupled with the mapping entity 840. The mapping entity 840 may be communicatively coupled with the IDFT entity 850. The IDFT entity 850 may be communicatively coupled with the CP+ entity 860.

The transmitter 800 may be implemented in any of a WTRU and a base station (or one or more other network elements). Solely for convenience, the following description assumes the transmitter 800 is implemented in a WTRU. The WTRU may include circuitry, including a processor and memory, configured to implement the transmitter and/or the various entities thereof.

Like the transmitter 700 of FIG. 7, the CSE entity 810 of FIG. 8 may generate and output an encoded CS. The mapping entity 840 may receive the encoded CS. The mapping entity 840 may perform a mapping operation on the encoded CS. The mapping entity 840 may output the mapped, encoded CS. The IDFT entity 850 may receive the mapped, encoded CS. The IDFT entity 850 may process the mapped, encoded CS into a time domain signal and may output the time domain signal. The CP+ 860 entity may receive the time domain signal, append a cyclic prefix, and output the modified time domain signal for further processing. The further processing may be carried out by one or more of the other transmitter entities (not shown). The further processing may include, for example, processing the modified time domain signal into a block based (e.g., OFDM) signal and/or transmitting the block-based signal.

The CSE entity 810 may include a first mapping entity 812, a second mapping entity 814, a third mapping entity 816, a synthesizer 818, an order encoder 820, a phase and sign encoder (collectively "phase encoder") 822, a shift encoder 824 and a summer 826. The CSE entity 810 may include other CSE processing entities, as well. The first, second and third mapping entities 812-816 and the synthesizer 818 may include bit/symbol processing functionality.

The summer 826 may include sequence processing functionality. The order, phase and shift encoders 820-824 may include both bit/symbol processing and sequence processing functionality. For simplicity of exposition, separate branches 828 interconnecting the order encoder 820, the phase encoder 822, the shift encoder 824 and the summer 826 are shown in FIG. 8 (e.g., as a construct) to illustrate the sequence processing carried out by the order encoder 820, the phase encoder 822, the shift encoder 824 and the summer 826.

Table 1 below lists parameters shown in FIG. 8 and referred to in the description that follows.

TABLE 1

| Variable | Field | Length | Type | Definition |
|---|---|---|---|---|
| a | Complex | $L_{p_1}$ | Input | A complementary sequence where its pair is b |
| b | Complex | $L_{p_1}$ | Input | A complementary sequence where its pair is a |
| c | Complex | $L_{p_2}$ | Input | A complementary sequence where its pair is d |
| d | Complex | $L_{p_2}$ | Input | A complementary sequence where its pair is c |
| d' | Integer | 1 | Input | Determine zero padding for sequence c and d |
| m | Positive integer | 1 | Input | Number of monomials degree of 1. It defines the number of branches ($2^m$), i.e., the length of output of phase, order, and shift encoders. |
| Bit Group P | Binary | $\leq \lfloor \log_2 (m!) \rfloor$ | Input | Un-coded information bits that configure $\pi$ |
| Map P | — | — | Input | Bit-map for $\pi$ |
| H | Positive integer | 1 | Input | Number of phases for the phase encoder |
| Bit Group C | Binary | $\leq \lfloor \log_2 (H^{m+1}) \rfloor$ | Input | Un-coded information bits that configure the phase encoder |
| Map C | — | — | Input | Bit-map for $c_0, \ldots, c_m \in \mathbb{Z}_H$ |
| $\mathbb{Z}_H = \{0, 1, 2, \ldots, H-1\}$ | Integer | H | Input | Alphabet for phase |
| Bit Group D | Binary | $\leq \lfloor \log_2 (H_s^m) \rfloor$ | Input | Un-coded information bits that configure the shift encoder |
| Map D | — | — | Input | Bit-map for $d_1, \ldots, d_m \in \mathbb{D}$ |
| $\mathbb{D}: \{D_{i=0, 1, \ldots, H_s-1} \mid D_i \in \mathbb{Z}\}$ | Integer | $H_s$ | Input | Base shifting factors |
| g | Complex | M | Output | Encoded complementary sequence |

The parameters listed in Table 1 may be configured such that the parameters, collectively, determine any of the number of non-zero and/or zero subcarriers (or more generally, the resource allocation assignment), the constellation type, the order of constellation, and the coding rate.

The parameters listed in Table 1 may be dynamically or semi-dynamically configured by the network. For example, a base station may indicate the seed sequences a, b, c, and d through one or more downlink control channels and different users may use different seed sequences. The indication may be an index (or indices) of a look-up (e.g., prescribed, predefined, etc.) table populated with the seed sequences a, b, c, and d. Alternatively, the seed sequences a, b, c, and d (e.g., the values thereof) may be transmitted.

Base shifting factors in $\mathbb{D}$ may be signaled through a control channel to configure a resource allocation in frequency. For example, the base station may indicate larger $D_{i|i=0, \ldots, H_s-1}$ values to exploit frequency diversity by increasing the separation between the non-zero subcarriers. For a contiguous allocation, the base station may set $D_{i|i=0, \ldots, H_s-1}$ to zeroes. In an embodiment, an offset may be signaled to shift the encoded complementary sequence g in the frequency domain.

$\mathbb{D}$ may be signaled to achieve frequency-shift keying (FSK) and information may be encoded in the separation with the subcarriers. The base station may generate reliable FSK signal (i.e., low PAPR) by exploiting the CSE element and the mobile station may decode the FSK signal. This type approach may be utilized to support low-power communication devices such as wake-up radios.

The base station may configure $\pi$ for each user by indicating a value of $\pi$ through a control channel. The user may use the indicated $\pi$ for its uplink transmission.

The constellation size q (i.e., number of phases for the phase encoder) may be transmitted from the network. It may be derived from a modulation coding scheme (MCS) table, for instance.

Representative Synthesizer

The synthesizer 818 may include one or more inputs and one or more outputs. The synthesizer inputs may receive a plurality of seed sequences, e.g., complementary sequences a, b, c and d. The complementary sequences a and b and the complementary sequences c and d may form Golay complementary pairs (GCPs) denoted as GCP (a, b) and a GCP (c, d), respectively. Although not shown, the complementary sequences a, b, c and d may be any two GCPs of lengths $L_{p_1}$ and $L_{p_2}$, respectively.

The synthesizer inputs may also receive parameter d'. The parameter d' may be a configuration parameter. The parameter d' may be a function of a resource allocation and/or a bit map in accordance with any example bit map(s) described below in connection with the shift encoder 824 of FIG. 8. The parameter d' may be received via signaling from a network.

The synthesizer 818 may synthesize or otherwise generate vectors $a_1$, $a_2$, $b_1$, and $b_2$ based on the sequences a, b, c and d and the parameter d'. The synthesizer 818 may output the vectors $a_1$, $a_2$, $b_1$, and $b_2$ via the synthesizer outputs. The vectors $a_1$, $a_2$, $b_1$, and $b_2$ may be outputted as column vector $[a_1^T, a_2^T, b_1^T, b_2^T]$ where $(\cdot)^T$ is the transpose of its argument. The synthesizer entity 818 may generate the vectors $a_1$, $a_2$, $b_1$, and $b_2$ in various ways. For example, the synthesizer entity 818 may covert or translate the sequences a, b, c and d into the vectors $a_1$, $a_2$, $b_1$, and $b_2$, where $a_1 \in \mathbb{C}^{L_o \times 1}$, $a_2 \in \mathbb{C}^{L_o \times 1}$, $b_1 \in \mathbb{C}^{L_o \times 1}$, and $b_2 \in \mathbb{C}^{L_o \times 1}$, according to:

$$a_1 = R(a^T \otimes [c^T 0_{1 \times d'}])^T \quad (39)$$

$$a_2 = R(b^T \otimes [d^T 0_{1 \times d'}])^T \quad (40)$$

$$b_1 = R((\tilde{b}^*)^T \otimes [c^T 0_{1 \times d'}])^T \quad (41)$$

and $$b_2 = R((\tilde{a}^*)^T \otimes [d^T 0_{1 \times d'}])^T \quad (42)$$

where $R=[I_{L_o} \ 0_{L_o \times d'}]$ is a matrix that may remove the last d' elements of the corresponding vector (the last d' elements of the corresponding vector may be zeroes), $L_o = L_{p_1}(L_{p_2}+d')-d'$, and $$a \in \mathbb{C}^{L_{p_1} \times 1}, b \in \mathbb{C}^{L_{p_1} \times 1}, c \in \mathbb{C}^{L_{p_2} \times 1} \text{ and } d \in \mathbb{C}^{L_{p_2} \times 1}$$

are the vectors for the sequences a, b, c and d.

For special cases of the above equations 39-42, the synthesizer 818 may apply different rules to form the vectors $a_1$, $a_2$, $b_1$, and $b_2$ from the sequences a, b, c and d. For example, the synthesizer 818 may form the vectors $a_1$, $a_2$, $b_1$, and $b_2$ such that $a_1=a$, $a_2=b$, $b_1=\tilde{b}^*$ and $b_2=\tilde{a}^*$ if the parameter d' is 0, the sequence c=(1) and the sequence d=(1). The synthesizer 818 may form the vectors $a_1$, $a_2$, $b_1$, and $b_2$ such that $a_1=c$, $a_2=d$, $b_1=c$ and $b_2=d$ if the parameter d' is 0, the sequence a=(1) and the sequence b=(1). The synthesizer 818 may form the vectors $a_1$, $a_2$, $b_1$, and $b_2$ such that $a_1=1$, $a_2=1$, $b_1=1$ and $b_2=1$ if the parameter d' is 0, the sequence a=(1), the sequence b=(1), the sequence c=(1) and the sequence d=(1). In these special cases, the pairs ($a_1$, $a_2$) and ($b_1$, $b_2$) may be GCPs.

In an embodiment, the synthesizer 818 may generate the vectors $a_1$, $a_2$, $b_1$, and $b_2$ using one or more look-up tables and one or more indices. The indices and/or one or more indications of the indices (collectively "indices") may be signaled to the WTRU from a network and/or from higher layers in the WTRU. The look-up tables may be populated based on the complementary sequences a, b, c and d. The signaled indices may include the parameter d' and/or one or more indications of any of the complementary sequences a, b, c and d.

The WTRU may be (dynamically, semi-statically and/or statically) configured with any of the look-up tables the complementary sequences a, b, c and d and the GCPs (a, b), (c, d) (and/or two other GCPs of lengths $L_{p_1}$ and $L_{p_2}$). The WTRU may receive, e.g., via signaling from a network, one or more configurations for configuring any of the complementary sequences a, b, c and d and the GCPs (a, b), (c, d) (and/or two other GCPs of lengths $L_{p_1}$ and $L_{p_2}$).

Representative First Mapping Entity

The first mapping entity 812 may include one or more inputs and one or more outputs. The inputs of first mapping entity 812 may receive a first set of the information symbols/bits. The first mapping entity 812 may apply a first map to the first set of the information symbols/bits to obtain a first set of coded information π ("coded information π"). The first mapping entity 812 may output the coded information π via its outputs.

Herein (e.g., supra and/or infra), (i) the terms "bit group P" may refer to "the first set of the information symbols/bits" and may be used interchangeably; (ii) the terms "Map P" may refer to "the first map" and may be used interchangeably; and/or (iii) the terms "bit-group P mapping entity" may refer to "the first mapping entity" and may be used interchangeably.

Map P may be in any of equation and look-up table form. In an embodiment, Map P may include a mapping between possible values of the first set of information symbols/bits and permutations of {1, 2, . . . , m} (i.e., the order of the sequence), where, for a given m, there are m! permutations. In an embodiment, each of the permutations may be mapped to a possible value of the first set of information symbols/ bits. Table 2 below provides an example of Map P listing possible values of the first set of information symbols/bits and corresponding values for the permutations of {1, 2, . . . , m}, where m=3.

TABLE 2

| Bits | π |
| --- | --- |
| 00 | [1 2 3] |
| 01 | [2 1 3] |
| 10 | [1 3 2] |
| 11 | [3 2 1] |

The first mapping entity 812, using the example of Map P provided in Table 2 as an example, may set the coded information π to one of the permutations [1 2 3], [2 1 3], [1 3 2] and [3 2 1] based on the value of the first set of information symbols/bits. For instance, the coded information π may be set to permutation [1 2 3] if the first set of information symbols/bits has a value of "00", whereas the coded information π may be set to permutation [3 2 1] if the first set of information symbols/bits has a value of "11".

Representative Order Encoder

The order encoder 820 may include one or more inputs and one or more outputs. The order-encoder inputs may receive the vectors $a_1$, $a_2$, $b_1$, and $b_2$ (e.g., as column vector [$a_1$, $a_2$, $b_1$, $b_2$]). The order-encoder inputs may receive the coded information π. The order encoder 820 may output a sequence ($x_0^T$, $x_1^T$, . . . , $x_{2^m-1}^T$) to the branches 828 via the order-encoder outputs. In an embodiment, the (k+1)th element of the sequence ($x_0^T$, $x_1^T$, . . . , $x_{2^m-1}^T$) may be output such that it corresponds to the vector at the (k+1)th branch, such as shown in FIG. 8. For indexing, the 0th element of the sequence ($x_0^T$, $x_1^T$, . . . , $x_{2^m-1}^T$) may be mapped to the 0th branch.

The order encoder 820 may generate the sequence ($x_0^T$, $x_1^T$, . . . , $x_{2^m-1}^T$) using the vectors $a_1$, $a_2$, $b_1$, and $b_2$ and the coded information π. In an embodiment, the order encoder 820 may generate the sequence ($x_0^T$, $x_1^T$, . . . , $x_{2^m-1}^T$) such that $x_r \in \{a_1, a_2, b_1, b_2\}$ and $x_r = a_1, a_2, b_1$ or $b_2$ based on the coded information π. For example, the sequence ($x_0^T$, $x_1^T$, . . . , $x_{2^m-1}^T$) that the order encoder 820 may generate may be different (i.e., different sequencing of $a_1$, $a_2$, $b_1$, and $b_2$) for each different value of the coded information π and/or for each different value of the first set of information symbols/bits. The latter assumes Map P defines a mapping with no duplicative values for the coded information π, such as the example of Map P provided in Table 2.

In an embodiment, the order encoder 820 may apply an ordering algorithm to the received vectors $a_1$, $a_2$, $b_1$, and $b_2$, where the ordering algorithm may be based on the coded information π. The ordering algorithm may be in any of equation or look-up table(s) form.

The ordering algorithm may be implemented using a matrix (denoted herein as "matrix Θ"). To obtain the sequence ($x_0^T$, $x_1^T$, . . . , $x_{2^m-1}^T$), the order encoder 820 may apply the matrix Θ to the vectors $a_1$, $a_2$, $b_1$, and $b_2$, e.g. in accordance with the following equation:

$$\begin{bmatrix} x_0^T \\ x_1^T \\ \vdots \\ x_{2^m-1}^T \end{bmatrix} = \Theta \begin{bmatrix} a_1^T \\ a_2^T \\ b_1^T \\ b_2^T \end{bmatrix}. \tag{43}$$

The matrix $\Theta$ may be, for example, matrix $[o_1\ o_2\ o_3\ o_4] \in \mathbb{R}^{L_o \times 4}$, where $o_1$, $o_2$, $o_3$, and $o_4$ may be column vectors for corresponding sequences $o_1$, $o_2$, $o_3$, and $o_4$. The column vectors $o_1$, $o_2$, $o_3$, and $o_4$ may be obtained from a truth table. The truth table may be populated based on the coded information $\pi$ and a set of algebraic functions. In an embodiment the set of algebraic functions may be based on an algebraic function $o_i: \mathbb{Z}_2^m \to \mathbb{Z}_2$, for the sequence $o_i \in \mathbb{Z}_2^{2^m}$ for i=1, 2, 3, 4. For example, the set of algebraic functions may be algebraic functions in the field of $\mathbb{Z}_2$, such as $$o_1(x_1, x_2, \ldots, x_m) = (1 - x_{\pi(2)})(1 - x_{\pi(1)}) \tag{44}$$

$$o_2(x_1, x_2, \ldots, x_m) = (1 - x_{\pi(2)})(x_{\pi(1)}) \tag{45}$$

$$o_3(x_1, x_2, \ldots, x_m) = x_{\pi(2)}(1 - x_{\pi(1)}) \tag{46}$$

and $$o_4(x_1, x_2, \ldots, x_m) = x_{\pi(2)} x_{\pi(1)} \tag{47}$$

where the coded information $\pi(n)$ may refer to an nth element of a permutation of $\{1, 2, \ldots, m\}$ and $x_j \in \mathbb{Z}_2$.

The truth table, the matrix $\Theta$ along with the sequence $(x_0^T, x_1^T, \ldots, x_{2^m-1}^T)$ generated using such truth table and/or the matrix $\Theta$ may be different (i.e., different sequencing) for each different value of the coded information $\pi$ and/or for each different value of the first set of information symbols/bits. The latter assumes Map P defines a mapping with no duplicative values for the coded information $\pi$, such as the example of Map P provided in Table 2.

Table 3 below provides an example of the truth table based on the coded information $\pi(n)$ and the set of algebraic functions (44), (45), (46) and (47), where the coded information $\pi(n) = [3\ 2\ 1]$ and lexicographic order is assumed for the algebraic functions (44), (45), (46) and (47).

TABLE 3

| k | $x_1$ | $x_2$ | $x_3$ | $o_1$ | $o_2$ | $o_3$ | $o_4$ |
|---|---|---|---|---|---|---|---|
| 0 | 0 | 0 | 0 | 1 | 0 | 0 | 0 |
| 1 | 0 | 0 | 1 | 0 | 1 | 0 | 0 |
| 2 | 0 | 1 | 0 | 0 | 0 | 1 | 0 |
| 3 | 0 | 1 | 1 | 0 | 0 | 0 | 1 |
| 4 | 1 | 0 | 0 | 1 | 0 | 0 | 0 |
| 5 | 1 | 0 | 1 | 0 | 1 | 0 | 0 |
| 6 | 1 | 1 | 0 | 0 | 0 | 1 | 0 |
| 7 | 1 | 1 | 1 | 0 | 0 | 0 | 1 |

The individual entries in Table 3 listed under $o_1$, $o_2$, $o_3$, and $o_4$ may be obtained from the algebraic functions where the coded information $\pi(n) = [3\ 2\ 1]$ and lexicographic order is assumed, namely:

$$o_1(x_1, x_2, \ldots, x_m) = (1 - x_2)(1 - x_3)$$

$$o_2(x_1, x_2, \ldots, x_m) = (1 - x_2) x_3$$

$$o_3(x_1, x_2, \ldots, x_m) = x_2 (1 - x_3)$$

and $$o_4(x_1, x_2, \ldots, x_m) = x_2 x_3.$$

The combined entries in Table 3 listed under each of $o_1$, $o_2$, $o_3$, and $o_4$ may form the column vectors $o_1$, $o_2$, $o_3$, and $o_4$, respectively. The matrix $\Theta$ obtained from the example of the truth table provided in Table 3 may be:

$$\Theta = [o_1\ o_2\ o_3\ o_4] = \begin{bmatrix} 1 & 0 & 0 & 0 \\ 0 & 1 & 0 & 0 \\ 0 & 0 & 1 & 0 \\ 0 & 0 & 0 & 1 \\ 1 & 0 & 0 & 0 \\ 0 & 1 & 0 & 0 \\ 0 & 0 & 1 & 0 \\ 0 & 0 & 0 & 1 \end{bmatrix}. \tag{48}$$

The order encoder 820 may generate the sequence $(x_0^T, x_1^T, \ldots, x_{2^m-1}^T)$ by applying the matrix $\Theta$ obtained from the example of truth table provided in Table 3 in accordance with equation (43), i.e.:

$$X = \begin{bmatrix} x_1^T \\ x_2^T \\ x_3^T \\ x_4^T \\ x_5^T \\ x_6^T \\ x_7^T \\ x_8^T \end{bmatrix} = \begin{bmatrix} 1 & 0 & 0 & 0 \\ 0 & 1 & 0 & 0 \\ 0 & 0 & 1 & 0 \\ 0 & 0 & 0 & 1 \\ 1 & 0 & 0 & 0 \\ 0 & 1 & 0 & 0 \\ 0 & 0 & 1 & 0 \\ 0 & 0 & 0 & 1 \end{bmatrix} \begin{bmatrix} a_1^T \\ a_2^T \\ b_1^T \\ b_2^T \end{bmatrix} = \begin{bmatrix} a_1^T \\ a_2^T \\ b_1^T \\ b_2^T \\ a_1^T \\ a_2^T \\ b_1^T \\ b_2^T \end{bmatrix}. \tag{49}$$

Based on the example of Map P provided in the Table 2, the sequence $(x_0^T, x_1^T, \ldots, x_{2^m-1}^T)$ generated in accordance with equation (49) may encode value of the first set of information symbols/bits corresponding to the coded information $\pi(n) = [3\ 2\ 1]$, namely, the value of "00".

Table 4 below provides an example of the truth table based on the coded information $\pi(n)$ and the set of algebraic functions (44), (45), (46) and (47), where the coded information $\pi(n) = [1\ 2\ 3]$ and lexicographic order is assumed for the algebraic functions (44), (45), (46) and (10).

TABLE 4

| k | $x_1$ | $x_2$ | $x_3$ | $o_1$ | $o_2$ | $o_3$ | $o_4$ |
|---|---|---|---|---|---|---|---|
| 0 | 0 | 0 | 0 | 1 | 0 | 0 | 0 |
| 1 | 0 | 0 | 1 | 1 | 0 | 0 | 0 |
| 2 | 0 | 1 | 0 | 0 | 0 | 1 | 0 |
| 3 | 0 | 1 | 1 | 0 | 0 | 1 | 0 |
| 4 | 1 | 0 | 0 | 0 | 1 | 0 | 0 |
| 5 | 1 | 0 | 1 | 0 | 1 | 0 | 0 |
| 6 | 1 | 1 | 0 | 0 | 0 | 0 | 1 |
| 7 | 1 | 1 | 1 | 0 | 0 | 0 | 1 |

The individual entries in Table 4 listed under $o_1$, $o_2$, $o_3$, and $o_4$ may be obtained from the algebraic functions where the coded information $\pi(n) = [1\ 2\ 3]$ and lexicographic order is assumed, namely:

$$o_1(x_1, x_2, \ldots, x_m) = (1 - x_2)(1 - x_1)$$

$$o_2(x_1, x_2, \ldots, x_m) = (1 - x_2) x_1$$

$$o_3(x_1, x_2, \ldots, x_m) = x_2 (1 - x_1)$$

and $$o_4(x_1, x_2, \ldots, x_m) = x_2 x_1.$$

The combined entries in Table 4 listed under each of $o_1$, $o_2$, $o_3$, and $o_4$ may form the column vectors $o_1$, $o_2$, $o_3$, and $o_4$, respectively. The matrix $\Theta$ obtained for the example of the truth table provided in Table 4 may be:

$$\Theta = [o_1 \quad o_2 \quad o_3 \quad o_4] = \begin{bmatrix} 1 & 0 & 0 & 0 \\ 1 & 0 & 0 & 0 \\ 0 & 0 & 1 & 0 \\ 0 & 0 & 1 & 0 \\ 0 & 1 & 0 & 0 \\ 0 & 1 & 0 & 0 \\ 0 & 0 & 0 & 1 \\ 0 & 0 & 0 & 1 \end{bmatrix}. \quad (50)$$

The order encoder 820 may generate the sequence $(x_0^T, x_1^T, \ldots, x_{2^m-1}^T)$ by applying the matrix $\Theta$ obtained from the example of truth table provided in Table 4 in accordance with equation (43), i.e.:

$$X = \begin{bmatrix} x_1^T \\ x_2^T \\ x_3^T \\ x_4^T \\ x_5^T \\ x_6^T \\ x_7^T \\ x_8^T \end{bmatrix} = \begin{bmatrix} 1 & 0 & 0 & 0 \\ 1 & 0 & 0 & 0 \\ 0 & 0 & 1 & 0 \\ 0 & 0 & 1 & 0 \\ 0 & 1 & 0 & 0 \\ 0 & 1 & 0 & 0 \\ 0 & 0 & 0 & 1 \\ 0 & 0 & 0 & 1 \end{bmatrix} \begin{bmatrix} a_1^T \\ a_2^T \\ b_1^T \\ b_2^T \end{bmatrix} = \begin{bmatrix} a_1^T \\ a_2^T \\ b_1^T \\ b_2^T \\ a_1^T \\ a_2^T \\ b_1^T \\ b_2^T \end{bmatrix}. \quad (51)$$

Based on the example of Map P provided in the Table 2, the sequence $(x_0^T, x_1^T, \ldots, x_{2^m-1}^T)$ generated in accordance with equation (51) may encode value of the first set of information symbols/bits corresponding to the coded information $\pi(n)=[1\ 2\ 3]$, namely, the value of "11".

Reverse lexicographic order may be used instead of lexicographic order in the foregoing by setting $k = \Sigma_{j=1}^{m} k_j 2^j$ is the $(k+1)$th element of the sequence.

In an embodiment, the order encoder 820 may generate the sequence $(x_0^T, x_1^T, \ldots, x_{2^m-1}^T)$ as follows. The order encoder 820 may carry out (e.g., perform calculations using) entry-wise mapping functions, such as according to:

$$(x_0^T, x_1^T, \ldots, x_{2^m-1}^T) = \mu_{a_1}(o_1) + \mu_{a_2}(o_2) + \mu_{b_1}(o_3) + \mu_{b_2}(o_4) \quad (52)$$

where: $\mu_{a_1}, \mu_{a_2}, \mu_{b_1},$ and $\mu_{b_2}$ are the entry-wise mapping functions: $\mu_{a_1}(a) = aa_1^T$, $\mu_{a_2}(a) = aa_2^T$, $\mu_{b_1}(a) = ab_1^T$, $\mu_{b_2}(a) = ab_2^T$; and the algebraic function $o_i: \mathbb{Z}_2^m \to \mathbb{Z}_2$ for the associated sequence $o_i \in \mathbb{Z}_2^{2^m}$ for i=1, 2, 3, 4 may be the algebraic functions in the field of $\mathbb{Z}_2$ as $$o_1(x_1, x_2, \ldots, x_m) = (1-x_{\pi(2)})(1-x_{\pi(1)}) \quad (53)$$

$$o_2(x_1, x_2, \ldots, x_m) = (1-x_{\pi(2)})(x_{\pi(1)}) \quad (54)$$

$$o_3(x_1, x_2, \ldots, x_m) = x_{\pi(2)}(1-x_{\pi(1)}) \quad (55)$$

and $$o_4(x_1, x_2, \ldots, x_m) = x_{\pi(2)} x_{\pi(1)} \quad (56)$$

where $\pi$ is a permutation of $\{1, 2, \ldots, m\}$, and $\pi(n)$ gives the nth element of $\pi$, and $x_j \in \mathbb{Z}_2$.

Representative Second Mapping Entity

The second mapping entity 814 may include one or more inputs and one or more outputs. The inputs of second mapping entity 814 may receive a second set of the information symbols/bits. The second mapping entity 814 may apply a second map to the second set of the information symbols/bits to obtain a second set of coded information $c_k$ ("coded information $c_k$"). The second mapping entity 814 may output the coded information $c_k$ via its outputs.

Herein (e.g., supra and/or infra), (i) the terms "bit group C" may refer to "the second set of the information symbols/bits" and may be used interchangeably; (ii) the terms "Map C" may refer to "the second map" and may be used interchangeably; and/or (iii) the terms "bit-group C mapping entity" may refer to "the second mapping entity" and may be used interchangeably.

Map C may be in any of equation and look-up table form. In an embodiment, Map C may include a mapping between possible values of the second set of information bits and the values of $c_k \in \mathbb{Z}_H$ where k=0, 1, 2, . . . , m. For a given m, there are $H^{m+1}$ combinations, and each combination may be mapped to one (or more) of possible values of the second set of information symbols/bits.

Table 5 below provides an example of Map C listing possible values of the second set of information symbols/bits and corresponding values for the coded information $c_k$. The values listed are for m=3 and H=4 (i.e., QPSK or q-PSK). The coded information $c_k$ may be of one of 4 different values, i.e., $c_k \in \{0,1,2,3\}$ and $c_k$ represents $\log_2 H=2$ information bits. Hence, it is possible to carry 8 bits with phase encoder when m=3, as detailed below.

TABLE 5

| Bits | $c_k$ |
|------|-------|
| 00   | 0     |
| 01   | 1     |
| 10   | 2     |
| 11   | 3     |

The second mapping entity 814, using the example of Map C provided in Table 5 as an example, may set the coded information $c_k$ to one of 0, 1, 2, 3 based on the value of the second set of information symbols/bits. For instance, the coded information $c_k$ may be set to 0 if the second set of information symbols/bits has a value of "00", whereas the coded information $c_k$ may be set to 3 if the first set of information symbols/bits has a value of '11'.

Note that $\Sigma_{k=1}^{m-1} x_{\pi(k)} x_{\pi(k+1)}$ may yield to different values for a given $\pi$ and may convey additional bits.

Representative Phase & Sign Encoder

The phase and sign encoder (collectively "phase encoder") 822 may include one or more inputs and one or more outputs. The phase-encoder inputs may receive the sequence $(x_0^T, x_1^T, \ldots, x_{2^m-1}^T)$, e.g., as a column vector. The phase-encoder inputs may receive the coded information $c_k$ and/or the coded information $\pi$. The phase encoder 822 may output a sequence $(y_0^T, y_1^T, \ldots, y_{2^m-1}^T)$ to the branches 828 via the phase-encoder outputs.

The phase encoder 822 may generate the sequence $(y_0^T, y_1^T, \ldots, y_{2^m-1}^T)$ using the sequence $(x_0^T, x_1^T, \ldots, x_{2^m-1}^T)$, the coded information $c_k$ and the coded information $\pi$. In an embodiment, the phase encoder 820 may apply a phase algorithm and a sign algorithm to the received sequence $(x_0^T, x_1^T, \ldots, x_{2^m-1}^T)$, where the phase and sign algorithms may be based on the coded information $c_k$ and the coded information $\pi$. Although shown as separate processing operations, the phase and sign algorithms may be combined. The phase and sign algorithms may be in any of equation or look-up table(s) form. An example equation form is provided first followed by examples providing the look-up table form.

The phase and sign algorithms may be based on Kenneth's theorem set forth in the glossary. The generalized Boolean function $f_{phase}: \mathbb{Z}_2^m \to \mathbb{Z}_H$ for the phase and sign algorithms may be characterized in the field of $\mathbb{Z}_H$ as $$f_{phase}(x_1, x_2, \ldots, x_m) = \underbrace{\frac{H}{2}\sum_{k=1}^{m-1} x_{\pi(k)}x_{\pi(k+1)}}_{f_{angle}(x_1,x_2,\ldots,x_m)} + \underbrace{\sum_{k=1}^{m} c_k x_{\pi(k)} + c_0}_{f_{sign}(z_1,x_2,\ldots,x_m)} \quad (57)$$

where the coded information $c_i \in \mathbb{Z}_H$, H is an even positive integer, the coded information $\pi(n)$ may refer to an nth element of a permutation of $\{1, 2, \ldots, m\}$ and $x_j \in \mathbb{Z}_2$.

The sequence output after application of the phase and sign algorithms to the sequence $(x_0^T, x_1^T, \ldots, x_{2^m-1}^T)$ may be mapped to another sequence via an entry-wise mapping function as $$w = (w_1, w_2, \ldots, w_{2^m}) = \mu_{phase}(f_{phase}) \quad (58)$$

where $f_{phase} \in \mathbb{Z}_H^{2^m}$ is the associated sequence for the function $f_{phase}$, and the entry-wise mapping function $\mu_{phase}(x) = \xi^x$ and $$\xi = e^{\frac{i2\pi}{H}}.$$

Alternatively, a constant phase may be applied to $\mu_{phase}(x) = \rho\xi^x$ where $|\rho|=1$ to rotate the constellation.

Assuming that the coded information $\pi = [3\ 2\ 1]$, $c_0=1$, $c_1=1$, $c_2=2$, $c_3=3$, m=3, and H=4, and lexicographic order is used, the generalized Boolean function for the phase and sign algorithms may be obtained for the coded information $\pi = [3\ 2\ 1]$ as $$f_{phase}(x_1, x_2, \ldots, x_m) = 2(x_3x_2 + x_2x_1) + c_1x_3 + c_2x_2 + c_3x_1 + c_0. \quad (59)$$

The corresponding sequence w may be calculated as set forth in Table 6 since $$\mu_{phase}(x) = e^{\frac{i2\pi}{4}x}.$$

TABLE 6

| k | $x_1$ | $x_2$ | $x_3$ | $\frac{H_p}{2}\sum_{k=1}^{m-1}x_{\pi(k)}x_{\pi(k+1)}$ | $\sum_{k=1}^{m}c_k x_{\pi(k)} + c_0$ | w |
|---|---|---|---|---|---|---|
| 0 | 0 | 0 | 0 | 0 | 1 | 1i |
| 1 | 0 | 0 | 1 | 0 | 2 | −1 |
| 2 | 0 | 1 | 0 | 0 | 3 | −1i |
| 3 | 0 | 1 | 1 | 2 | 0 | −1 |
| 4 | 1 | 0 | 0 | 0 | 0 | 1 |
| 5 | 1 | 0 | 1 | 0 | 1 | 1i |
| 6 | 1 | 1 | 0 | 2 | 2 | 1 |
| 7 | 1 | 1 | 1 | 0 | 3 | −1i |

As another example, assuming that the coded information $\pi = [1\ 2\ 3]$, $c_0=1$, $c_1=1$, $c_2=2$, $c_3=3$, m=3, and H=4, and that lexicographic order is used, the generalized Boolean function for the phase and sign algorithms may be obtained for $\pi = [1\ 2\ 3]$ as $$f_{phase}(x_1, x_2, \ldots, x_m) = 2(x_1x_2 + x_2x_3) + c_1x_1 + c_2x_2 + c_3x_3 + c_0. \quad (60)$$

The corresponding sequence w may be calculated as set forth in Table 7 since $$\mu_{phase}(x) = e^{\frac{i2\pi}{4}x}.$$

TABLE 7

| k | $x_1$ | $x_2$ | $x_3$ | $\frac{H_p}{2}\sum_{k=1}^{m-1}x_{\pi(k)}x_{\pi(k+1)}$ | $\sum_{k=1}^{m}c_k x_{\pi(k)} + c_0$ | w |
|---|---|---|---|---|---|---|
| 0 | 0 | 0 | 0 | 0 | 1 | 1i |
| 1 | 0 | 0 | 1 | 0 | 0 | 1 |
| 2 | 0 | 1 | 0 | 0 | 3 | −1i |
| 3 | 0 | 1 | 1 | 2 | 2 | 1 |
| 4 | 1 | 0 | 0 | 0 | 2 | −1 |
| 5 | 1 | 0 | 1 | 0 | 1 | 1i |
| 6 | 1 | 1 | 0 | 2 | 0 | −1 |
| 7 | 1 | 1 | 1 | 0 | 3 | −1i |

Representative Third Mapping Entity

The third mapping entity 816 may include one or more inputs and one or more outputs. The inputs of third mapping entity 816 may receive a third set of the information symbols/bits and base shifting factors. The third mapping entity 816 may apply a third map to the third set of the information symbols/bits to obtain a third set of coded information $d_k$ ("coded information $d_k$"). The third mapping entity 816 may output the coded information $d_k$ via its outputs.

Herein (e.g., supra and/or infra), (i) the terms "bit group D" may refer to "the third set of the information symbols/bits" and may be used interchangeably; (ii) the terms "Map D" may refer to "the third map" and may be used interchangeably; and/or (iii) the terms "bit-group D mapping entity" may refer to "the third mapping entity" and may be used interchangeably.

Map D may be in any of equation and look-up table form. In an embodiment, Map D may include a mapping between possible values of the third set of information bits and the values of $d_k \in \mathbb{D} = \{D_0, D_1, \ldots, D_{H_s-1}\}$ where k=0, 1, 2, ..., m, and $D_0, D_1, \ldots, D_{H_s-1}$ are the base shifting factors. For a given $H_s$, there are $H_s^m$ combinations and each combination may be mapped to a bit value. An example mapping is provided in Table 8 for $\mathbb{D} = \{0, 50, 100, 150\}$. In this example, $d_k$ may be of one of $H_s=4$ different values, i.e., $d_k \in \{0, 50, 100, 150\}$ and $d_k$ represents $\log_2 H_s=2$ information bits. Hence, it is possible to carry $\log_2 H_s \times m=6$ bits with shift encoder when $H_s=4$ and m=3.

TABLE 8

| Bits | $d_k$ |
|---|---|
| 00 | 0 |
| 01 | 50 |
| 10 | 100 |
| 11 | 150 |

Note that the shift encoder may generate null symbols at the CSE output while maintaining PAPR no more than 3 dB. This feature may be utilized to generated multi-carrier frequency shift keying (FSK), signature design for sparse carrier multiple access, interlace design for NR-U, and frequency domain index modulation. In a different application, the shift encoder may only be used for adjusting the resource allocation and may be directly or indirectly indicated by the network.

Representative Shift Encoder

The shift encoder 824 may include one or more inputs and one or more outputs. The shift-encoder inputs may receive the sequence $(y_0^T, y_1^T, \ldots, y_{2^m-1}^T)$, e.g., as column vector. The shift-encoder inputs may receive the coded information $d_k$ and/or the coded information $\pi$. The shift encoder 824 may output a sequence $(z_0^T, z_1^T, \ldots, z_{2^m-1}^T)$ to the branches 828 via the shift-encoder outputs.

The shift encoder 824 may generate the sequence ($z_0^T$, $z_1^T, \ldots, z_{2^m-1}^T$) using the sequence ($y_0^T, y_1^T, \ldots, y_{2^m-1}^T$), the coded information $d_k$ and the coded information $\pi$. In an embodiment, the shift encoder 824 may apply a shift algorithm to the received sequence ($y_0^T, y_1^T, \ldots, y_{2^m-1}^T$), where the shift algorithm may be based on the coded information $d_k$ and the coded information $\pi$. The shift algorithm may be in any of equation or look-up table(s) form. An example equation form is provided first followed by examples providing the look-up table form.

The generalized Boolean function $f_{shift}$: $\mathbb{Z}_2^m \rightarrow \mathbb{Z}$ for the shift algorithm may be characterized in the field of $\mathbb{Z}$ as $$f_{shift}(x_1, x_2, \ldots, x_m) = \Sigma_{k=1}^m d_k x_{\pi(k)} \quad (61)$$

where $d_k \in \mathbb{D}: \{D_{i=0, 1, \ldots, H_s-1} | D_i \in \mathbb{Z}\}$, the coded information $\pi(n)$ may refer to an nth element of a permutation of $\{1, 2, \ldots, m\}$, and $x_j \in \mathbb{Z}_2$.

The sequence output after application of the shift algorithm to the sequence ($y_0^T, y_1^T, y_{2^m-1}^T$) may be mapped to another sequence via an entry-wise mapping function as $$s = (s_1, s_2, \ldots, s_{2^m}) = f_{shift} + (0, L_0, 2L_0, \ldots, (2^m-1)L_0) \quad (62)$$

where $f_{shift} \in \mathbb{Z}^{2^m}$ is the associated sequence for the function $f_{shift}$.

If all $d_k=0$ for all k, then $s=(0, L_0, 2L_0, \ldots, (2^m-1)L_0)$ which leads to a contiguous CS. If $d_k \neq 0$, then the shift encoder may cause overlapping or a non-contiguous CS in frequency domain as the supports of the sequences may intersect or be disjoint in frequency. To avoid overlapping of the sequences due to the shifts in frequency, the condition given by $$d_{k|\pi(k)=a} \geq \Sigma_{l \in S: \{n|\pi(n) > a\}} d_l \quad (63)$$

may be satisfied for $1 \leq a \leq m-1$. If this condition is satisfied the sequence length is obtained as $L_0 2^m + \Sigma_l^m d_l$ and the alphabet remains the same for the non-zero elements.

In certain conditions, overlapping may be allowed. For example, if the sequences a, b, c and d has zero elements, certain values of $d_k$ do not change the alphabet for the non-zero elements as there is no two non-zero elements overlap with each other. Several examples which uses this property are provided herein below.

Assuming that the coded information $\pi=[1\ 2\ 3]$, $d_1=150$, $d_2=100$, $d_3=50$, and m=3, and that lexicographic order is used:

$$f_{shift}(x_1, x_2, \ldots, x_m) = d_1 x_1 + d_2 x_2 + d_3 x_3 + d_0. \quad (64)$$

The corresponding sequence s may be calculated as set forth in Table 9 since $\mu_{phase}(x)=x$. This choice does not cause overlapping in frequency because $$d_{k|\pi(k)=1} = d_1 = 150 \geq \Sigma_{l \in S: \{n|\pi(n)>1\}} d_l = d_2 + d_3 = 150 \quad (65)$$

and $$d_{k|\pi(k)=2} = d_2 = 100 \geq \Sigma_{l \in S: \{n|\pi(n)>2\}} d_l = d_3 = 50. \quad (66)$$

TABLE 9

| k | $x_1$ | $x_2$ | $x_3$ | $\Sigma_{k=1}^m d_k x_{\pi(k)}$ | w |
|---|---|---|---|---|---|
| 0 | 0 | 0 | 0 | 0 | 0 |
| 1 | 0 | 0 | 1 | 50 | 50 + $L_0$ |
| 2 | 0 | 1 | 0 | 100 | 100 + $L_0$ |
| 3 | 0 | 1 | 1 | 150 | 150 + $L_0$ |
| 4 | 1 | 0 | 0 | 150 | 150 + $L_0$ |
| 5 | 1 | 0 | 1 | 200 | 200 + $L_0$ |

TABLE 9-continued

| k | $x_1$ | $x_2$ | $x_3$ | $\Sigma_{k=1}^m d_k x_{\pi(k)}$ | w |
|---|---|---|---|---|---|
| 6 | 1 | 1 | 0 | 250 | 250 + $L_0$ |
| 7 | 1 | 1 | 1 | 300 | 300 + $L_0$ |

Representative Sequence Processing

The sequence processing of ($x_0^T, x_1^T, \ldots, x_{2^m-1}^T$) may include sequence modulation, sequence shifting, sequence summation steps and frequency domain mapping.

The transmitted signal $t \in \mathbb{C}^{N+N_{cp} \times 1}$ may be expressed as $$t = AF^H Mg \quad (67)$$

where F is the discrete Fourier transform matrix, $M \in \mathbb{Z}^{N \times M}$ is the subcarrier mapping matrix, and $A \in \mathbb{R}^{N+N_{cp} \times N}$ is the matrix that prepends a cyclic prefix to the signal, and $g \in \mathbb{C}^{M \times 1}$ is the encoded CS. The vector g may be obtain using $$g = \Sigma_{k=0}^{2^m-1} w_k S_k x_k \quad (68)$$

where k is the branch index, $x_k \in \{a_1, a_2, b_1, b_2\}$ is the sequence at the kth branch output from the order encoder 820 and $a_1 \in \mathbb{C}^{L_o \times 1}$, $a_2 \in \mathbb{C}^{L_o \times 1}$, $b_1 \in \mathbb{C}^{L_o \times 1}$, and $b_2 \in \mathbb{C}^{L_o \times 1}$, $w_k$ is a unit-norm complex number (i.e., $|w_k|=1$) generated through the phase encoder and $$e^{\frac{j2\pi}{H}(\cdot)}$$

operation (i.e., constellation mapping operation) and $w_r$ is multiplied with the vector $x_k^T$ as $y_k^T = w_k x_k^T \in \mathbb{C}^{L_o \times 1}$, $S_k = [0_{L_o \times s_k}\ I_{L_o}\ 0_{L_o \times T - s_k}]^T$ is the shifting matrix for the kth branch which pads the modulated vector $y_k^T$ by $s_k$ and $T - s_k$ null symbols to the left and the right as $z_k = S_k y_k = [0_{s_k \times 1}^T\ y_k^T\ 0_{T - s_k \times 1}^T]^T$ where $T = \max(s_{i|i=1, 2 \ldots 2^m})$ and $s_k$ is the output of the shift encoder, and the length of vector g is equal to $M = T + L_0 = \max(s_{i|i=1, 2, \ldots, 2^m}) + L_{p_1}(L_{p_2} + d_0) - d_0$.

Figure 9:
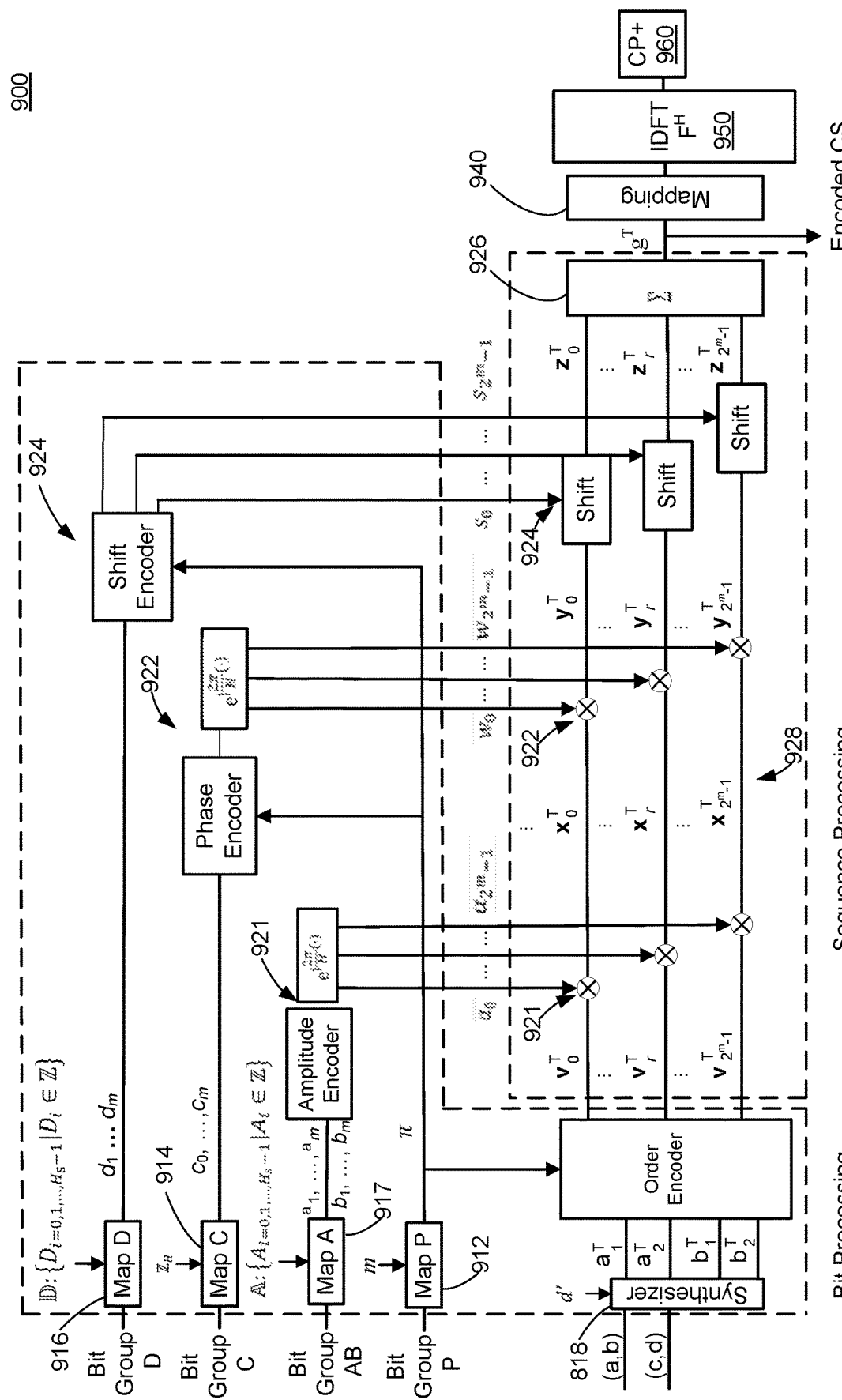
FIG. 9 is a block diagram illustrating an example transmitter in which one or more embodiments may be implemented.

Referring now to FIG. 9, a block diagram illustrating an example transmitter 900 in which one or more embodiments may be implemented is shown. The transmitter 900 may include a CSE entity 910, a mapping entity 940, an IDFT entity 950, and a CP+ entity 960. The CSE entity 910 may be communicatively coupled with the mapping entity 940. The mapping entity 940 may be communicatively coupled with the IDFT entity 950. The IDFT entity 950 may be communicatively coupled with the CP+ entity 960. The transmitter 900 may be implemented in any of a WTRU and a base station (or one or more other network elements). Solely for convenience, the following description assumes the transmitter 900 is implemented in a WTRU. The WTRU may include circuitry, including a processor and memory, configured to implement the transmitter and/or the various entities thereof.

Like the transmitters 700 and 800 of FIGS. 7 and 8, the CSE entity 910 of FIG. 9 may generate and output an encoded CS. The mapping entity 940 may receive the encoded CS. The mapping entity 940 may perform a mapping operation on the encoded CS. The mapping entity 940 may output the mapped, encoded CS. The IDFT entity 950 may receive the mapped, encoded CS. The IDFT entity 950 may process the mapped, encoded CS into a time domain signal and may output the time domain signal. The CP+ 960 entity may receive the time domain signal, append a cyclic prefix and output the modified time domain signal for further processing. The further processing may be carried out by one or more of the other transmitter entities (not shown). The further processing may include, for example, processing the modified time domain signal into a block based (e.g., OFDM) signal and/or transmitting the block-based signal.

The CSE entity 910 may include a first mapping entity 912, a second mapping entity 914, a third mapping entity 916, a fourth mapping entity 917, a synthesizer 918, an order encoder 920, an amplitude encoder 921, a phase and sign encoder (collectively "phase encoder") 922, a shift encoder 924 and a summer 926. The CSE entity 910 may include other CSE processing entities, as well.

The first, second, third and fourth mapping entities 912-917 and the synthesizer 918 may include bit/symbol processing functionality. The summer 926 may include sequence processing functionality. The order, amplitude, phase and shift encoders 920-924 may include both bit/symbol processing and sequence processing functionality. For simplicity of exposition, separate branches 928 interconnecting the order encoder 920, the amplitude encoder 921, the phase encoder 922, the shift encoder 924 and the summer 926 are shown in FIG. 9 (e.g., as a construct) to illustrate the sequence processing carried out by the order encoder 920, the amplitude encoder 921, the phase encoder 922, the shift encoder 924 and the summer 926. The CSE entity 910 of FIG. 9 is similar to the CSE entity 810 of FIG. 8, except for the fourth mapping entity 919, amplitude encoder 921 and as described herein, Table 10 below lists parameters shown in FIG. 9 and referred to in the description that follows.

TABLE 10

| Variable | Field | Length | Type | Definition |
|---|---|---|---|---|
| a | Complex | $L_{p_1}$ | Input | A complementary sequence where its pair is b |
| b | Complex | $L_{p_1}$ | Input | A complementary sequence where its pair is a |
| c | Complex | $L_{p_2}$ | Input | A complementary sequence where its pair is d |
| d | Complex | $L_{p_2}$ | Input | A complementary sequence where its pair is c |
| d' | Integer | 1 | Input | Determine zero padding for sequence c and d |
| m | Positive integer | 1 | Input | Number of monomials degree of 1. It defines the number of branches ($2^m$), i.e., the length of output of phase, order, and shift encoders. |
| Bit Group P | Binary | $\leq \log_2(m!)$ | Input | Un-coded information bits that configure π |
| Map P | — | — | Input | Bit-map for π |
| Bit Group AB | Binary | Based on desired constellation | Input | Un-coded information bits that configure the amplitude encoder |
| Map AB | — | — | Input | Bit-map for $a_1, \ldots, a_m \in \mathbb{A}$ and $b_1, \ldots, b_m \in \mathbb{A}$ |
| $\mathbb{A}: \{A_{i=0,1,\ldots,H_a-1} \mid A_i \in \mathbb{Z}\}$ | Integer | $H_a$ | Input | Base factors for amplitude |
| H | Positive integer | 1 | Input | Number of phases for the phase encoder |
| Bit Group C | Binary | $\leq \log_2(H^{m+1})$ | Input | Un-coded information bits that configure the phase encoder |
| Map C | — | — | Input | Bit-map for $c_0, \ldots, c_m \in \mathbb{Z}_H$ |
| $\mathbb{Z}_H = \{0, 1, 2, \ldots, H-1\}$ | Integer | H | Input | Alphabet for phase |
| Bit Group D | Binary | $\leq \log_2(H_s^m)$ | Input | Un-coded information bits that configure the shift encoder |
| Map D | — | — | Input | Bit-map for $d_1, \ldots, d_m \in \mathbb{D}$ |
| $\mathbb{D}: \{D_{i=0,1,\ldots,H_s-1} \mid D_i \in \mathbb{Z}\}$ | Integer | $H_s$ | Input | Base shifting factors |
| g | Complex | M | Output | Encoded complementary sequence |

The parameters listed in Table 10 may be configured such that the parameters, collectively, determine any of the number of non-zero and/or zero subcarriers (or more generally, the resource allocation assignment), the constellation type, the order of constellation, and the coding rate.

Representative Fourth Mapping Entity

The fourth mapping entity 917 may include one or more inputs and one or more outputs. The inputs of fourth mapping entity 917 may receive a fourth set of the information symbols/bits and a set of base amplitude factors. The fourth mapping entity 917 may apply a fourth map to the fourth set of the information symbols/bits to obtain values of $a_k$, $b_k$. The fourth mapping entity 814 may output the values of $a_k$, $b_k$ via its outputs. Herein (e.g., supra and/or infra), (i) the terms "bit group AB" may refer to "the fourth set of the information symbols/bits" and may be used interchangeably; (ii) the terms "Map AB" may refer to "the fourth map" and may be used interchangeably; and/or (iii) the terms "bit-group AB mapping entity" may refer to "the fourth mapping entity" and may be used interchangeably.

Map AB may be in any of equation and look-up table form. In an embodiment, Map A may include a mapping between possible values of the fourth set of information bits and the values of $a_k$, $b_k \in \mathbb{A}$ where k=1, 2, . . . , m, and $A_1, A_2, \ldots, A_{H_a}$ are the base amplitude factors. For a given $H_a$, there are $H_a^{2(m+1)}$ combinations and each combination may be mapped to a bit value.

Figure 10:
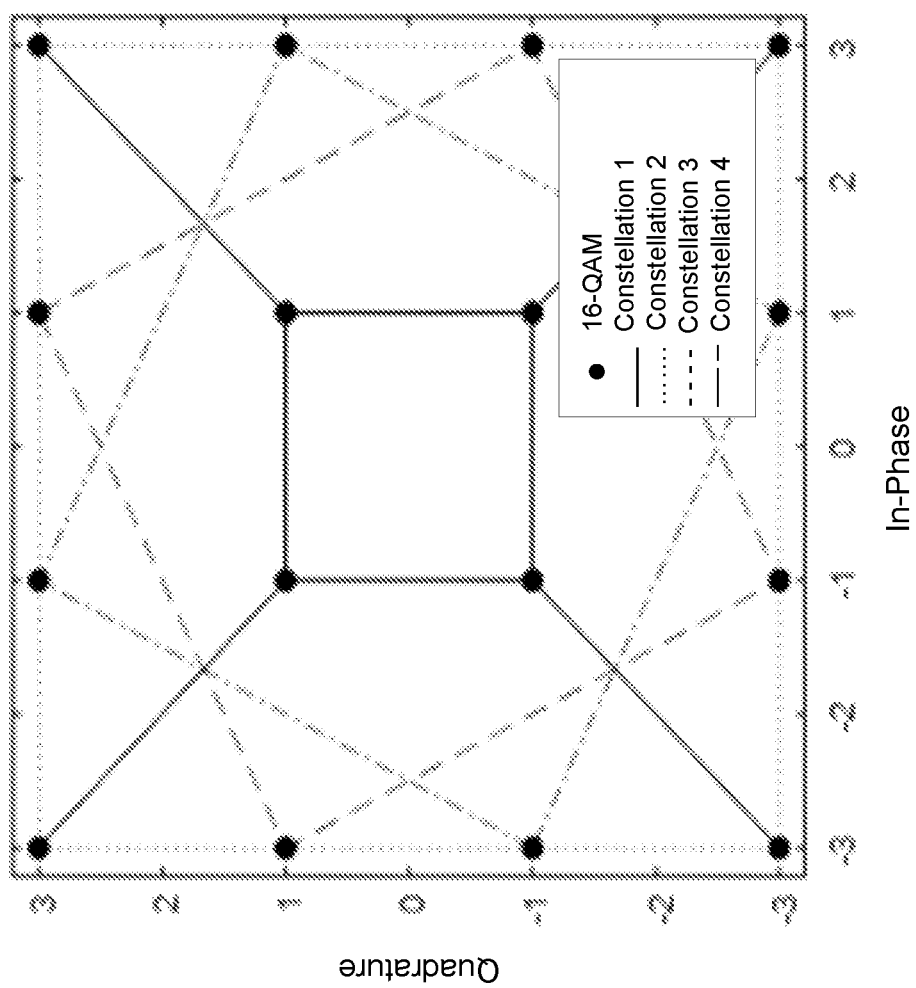
FIG. 10 illustrates constellations for complementary sequences with 16-QAM constellation.

For a given constellation, for example M-QAM, additional rules may be applied. For example, for 16-QAM, for a given π, it is possible to synthesize 2m contiguous CSs of length of $L_0 2^m$ if either $a_l$ or $b_l$ is set to $$\frac{2}{\pi}\ln 3$$

while $a_n = b_n = 0$ for n≠l and l=1, 2, . . . , m, $d_n = 0$, and H=4, and $L_0 > 1$, and $a_1$, $a_2$, $b_1$, $b_2$ are sequences with QPSK constellation of $\{e^{j\pi/4}, e^{3j\pi/4}, e^{5j\pi/4}, e^{7j\pi/4}\}$. The constellation formed due to such operation may be, for example, constellation 1 shown FIG. 10. The other constellations in FIG. 10 may be obtained by scaling and rotating the original QPSK alphabet for $a_1$, $a_2$, $b_1$, $b_2$. In total, m! $4^m+1(2m+4)$ contiguous CSs (i.e., no null elements) of length of $L_0 2^M$ with 16-QAM constellation may be obtained. Noncontiguous CSs of length $L_0 2^M + \Sigma_{l=0}^m d_l$ may be obtained via a shifting encoder, such as provide herein. Other generalization for M-QAM and non-uniform constellation may be derived based on similar rationale or rules.

Representative Amplitude Encoder

The amplitude encoder 921 may include one or more inputs and one or more outputs. The amplitude-encoder inputs may receive the sequence $(v_0^T, v_1^T, \ldots, v_{2^m-1}^T)$, output from the order encoder 820. The amplitude-encoder inputs may receive the values of $a_k$, $b_k$ output from the fourth mapping entity 917. The amplitude encoder 822 may output a sequence $(x_0^T, x_1^T, \ldots, x_{2^m-1}^T)$ to the branches 928 via the amplitude-encoder outputs.

The amplitude encoder 921 may generate the sequence $(x_0^T, x_1^T, \ldots, x_{2^m-1}^T)$ using the sequence $(v_0^T, v_1^T, \ldots, v_{2^m-1}^T)$, the values of $a_k$, $b_k$ and the coded information $\pi$. In an embodiment, the amplitude encoder 921 may apply a amplitude algorithm to the received sequence $(x_0^T, x_1^T, \ldots, x_{2^m-1}^T)$, where the amplitude algorithm may be based on the values of $a_k$, $b_k$ and the coded information $\pi$. The amplitude algorithm may be in any of equation or look-up table(s) form. An example equation form is provided first followed by examples providing the look-up table form.

The generalized Boolean function $f_{phase}$: $\mathbb{Z}_2^m \to \mathbb{R}$ for the amplitude algorithm may be characterized in the field of $\mathbb{R}$ as $$f_{amplitude}(x_1, x_2, \ldots, x_m) = a_m x_{\pi(m)} + b_m (1 - x_{\pi(m)}) + \sum_{k=1}^{m-1} a_k(x_{\pi(k)} + x_{\pi(k+1)}) + a_m x_{\pi(m)} + \sum_{k=1}^{m-1} b_k(1 - x_{\pi(k)} - x_{\pi(k+1)})$$

where $a_i$, $b_i \in \mathbb{A}$ : $\{A_{i=0, 1, \ldots, H_{a-1}} | A_i \in \mathbb{R}\}$ the coded information $\pi(n)$ may refer to an nth element of a permutation of $\{1, 2, \ldots, m\}$, and $x_j \in \mathbb{Z}_2$.

In an embodiment, the entry-wise mapping function may be chosen to be compatible to the entry-wise mapping function of the phase encoder as $$\alpha = (\alpha_1, \alpha_2, \ldots, \alpha_{2^m}) = \mu_{amplitude}(f_{amplitude})$$

where $f_{amplitude} \in \mathbb{R}^{2^m}$ is the associated sequence for the function $f_{amplitude}$ and the entry-wise mapping function $\mu_{amplitude}(x) = \xi^x$ and $$\xi = e^{\frac{2\pi}{H}}$$

(i.e., without $\sqrt{-1}$).

Assume that $\pi = [1\ 2\ 3]$, $a_1 = 0$, $a_2 = 0$, $$a_3 = \frac{2}{\pi} \ln 3,$$

$b_1 = 0$, $b_2 = 0$, $b_3 = 0$ and m=3, and that lexicographic order is used, $$f_{amplitude}(x_1, x_2, \ldots, x_m) = a_m x_{\pi(m)} + b_m(1 - x_{\pi(m)}) + \sum_{k=1}^{m-1} a_k(x_{\pi(k)} + x_{\pi(k+1)}) + a_m x_{\pi(m)} + \sum_{k=1}^{m-1} b_k(1 - x_{\pi(k)} - x_{\pi(k+1)}) = \frac{2}{\pi} \ln 3\, x_{\pi(3)}$$

The corresponding sequence α may then be calculated as in Table 11 since $\mu_{amplitude}(x) = \xi^x$ and $$\xi = e^{\frac{2\pi}{H}}.$$

As a result, amplitude encoder scales the sequence on the kth branch in FIG. 9.

TABLE 11

| k | $x_1$ | $x_2$ | $x_3$ | $f_{amplitude}(x_1, x_2, \ldots, x_m)$ | s |
|---|---|---|---|---|---|
| 0 | 0 | 0 | 0 | 0 | |
| 1 | 0 | 0 | 1 | 0.6994 | 1.0000 |
| 2 | 0 | 1 | 0 | 0 | 3.0000 |
| 3 | 0 | 1 | 1 | 0.6994 | 1.0000 |
| 4 | 1 | 0 | 0 | 0 | 3.0000 |
| 5 | 1 | 0 | 1 | 0.6994 | 1.0000 |
| 6 | 1 | 1 | 0 | 0 | 3.0000 |
| 7 | 1 | 1 | 1 | 0.6994 | 1.0000 |

Additional operations for sequence processing due to the amplitude encoder 921 may include the addition of $a_k$ in g as $$g = \Sigma_{k=0}^{2m-1} \alpha_k w_k s_k x_k$$

where $a_k$ is a real number generated through the amplitude encoder.

Representative Use Case—NR-U Interlace Design for NR-U

Figure 11:
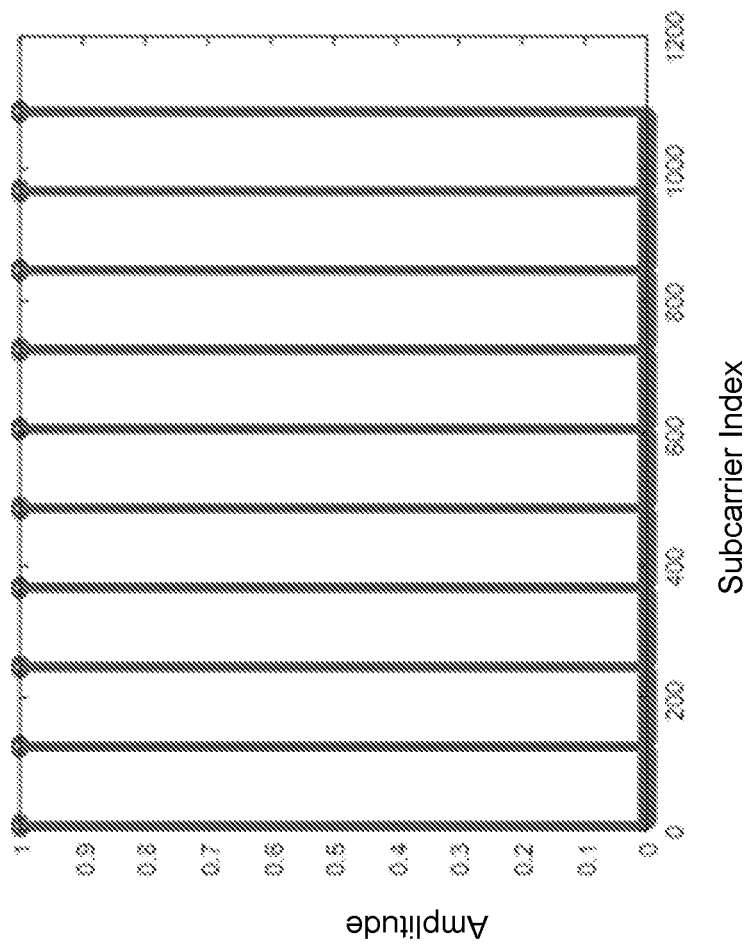
FIG. 11 illustrates an example interlace in accordance with an embodiment.

FIG. 11 illustrates an example interlace according to an embodiment. The interlace of FIG. 11 may be generated using the transmitter 800 of FIG. 8. The interlace of FIG. 11 may be generated using other transmitters, as well. The interlace may be suitable for NR-U operation. The interlace may include 120 subcarriers of an OFDM symbol subdivided into 10 clusters of 12 subcarriers with 9×12 subcarriers separating otherwise adjacent clusters.

The parameters listed in Table 12 or Table 13 may be used by the transmitter 800 to generate the interlace. Alternatively, the parameters listed in both Table 12 and Table 4-13 may be used by the transmitter 800 to generate the interlace (e.g., to convey more than 10 bits).

In an embodiment, the transmitter 800 may generate the interlace using the parameters listed in Table 12 to place phase-rotated versions of multiple of c and d within one RB (e.g., 12 subcarriers) adjacent to each other. The interlace generated using parameters listed in Table 12 may carry 10 bits. In an embodiment, Bit Group P and/or Bit Group C may be fixed to certain values. For example, Bit Group P may be set to (0,0) and Bit Group C may carry the 8 bits. Fixing Bit Group P and/or Bit Group C to certain values may decrease receiver complexity.

TABLE 12

Example Parameters for Adjacent Configuration for NR-U PUCCH

| Variable | Value |
|---|---|
| a | (1, 1, 1, −i, i) |
| b | (1, i, −1, 1, −i) |
| c | $\frac{\sqrt{2}+i\sqrt{2}}{2} \times (1, i, 1)$ |
| d | $\frac{\sqrt{2}+i\sqrt{2}}{2} \times (1, 1, -1)$ |
| d' | 117 |
| Bit Group P<br>Map P | $(b_0^P, b_1^P)$ that configures $\pi$ |

| $(b_0^P, b_1^P)$ | $\pi$ |
|---|---|
| 00 | [1 2 3] |
| 01 | [2 1 3] |
| 10 | [1 3 2] |
| 11 | [3 2 1] |

| Bit Group C<br>Map C | $(b_0^C, b_1^C, \ldots,$ that configures the phase encoder<br>$(b_{2k}^C, b_{2k+1}^C)$ | $c_k$ |
|---|---|---|
| | 00 | 0 |
| | 01 | 1 |
| | 10 | 2 |
| | 11 | 3 |
| | for k = 0, 1, 2, 3 | |
| Bit Group D<br>Map D | Fixed value(s)<br>$d_{k|\pi(k)=3} = -480$, $d_{k|\pi(k)\neq 3} = -960$, $d_{k|\pi(k)=1} = -1332$, i.e., the output of shift encoder is fixed to s = (0, 3, 6, 9, 600, 603, 606, 609) | |
| m | 3 | |
| H | 4 | |
| $d_{k|k=0,\ldots,H_s-1}$ | Not used | |

In an embodiment, the transmitter 800 may generate the interlace using the parameters listed in Table 13 to place phase rotated versions of multiple of non-zero elements of c and d within one RB (i.e., 12 subcarriers) in interleaved manner. The interlace generated using the parameters listed in Table 13 may carry 10 bits. In an embodiment, Bit Group P and/or Bit Group C may be fixed to certain values. For example, Bit Group P may be set to (0,0) and Bit Group C may carry the 8 bits. Fixing Bit Group P and/or Bit Group C to certain values may decrease receiver complexity.

TABLE 13

Example Parameters for Interleaved Configuration for NR-U PUCCH

| Variable | Value |
|---|---|
| a | (1, 1, 1, −i, i) |
| b | (1, i, −1, 1, −i) |
| c | $\frac{\sqrt{2}+i\sqrt{2}}{2} \times (1, 0, 0, 0, i, 0, 0, 0, 1, 0, 0, 0)$ |
| d | $\frac{\sqrt{2}+i\sqrt{2}}{2} \times (1, 0, 0, 0, 1, 0, 0, 0, -1, 0, 0, 0)$ |
| d' | 108 |
| Bit Group P<br>Map P | $(b_0^P, b_1^P)$ that configures $\pi$ |

| $(b_0^P, b_1^P)$ | $\pi$ |
|---|---|
| 00 | [1 2 3] |
| 01 | [2 1 3] |
| 10 | [1 3 2] |
| 11 | [3 2 1] |

TABLE 13-continued

Example Parameters for Interleaved Configuration for NR-U PUCCH

| Variable | Value |
|---|---|
| Bit Group C<br>Map C | $(b_0^C, b_1^C, \ldots, b_7^C)$ that configures the phase encoder<br>$(b_{2k}^C, b_{2k+1}^C)$ | $c_k$ |

| $(b_{2k}^C, b_{2k+1}^C)$ | $c_k$ |
|---|---|
| 00 | 0 |
| 01 | 1 |
| 10 | 2 |
| 11 | 3 |
| for k = 0, 1, 2, 3 | |

| Bit Group D<br>Map D | Fixed value(s)<br>$d_{k|\pi(k)=3} = -491$, $d_{k|\pi(k)\neq 2} = -982$, $d_{k|\pi(k)=1} = 1368$, i.e., the output of shift encoder is fixed to s = (0, 3, 6, 9, 600, 603, 606, 609) |
| m | 3 |
| H | 4 |
| $d_{k|k=0,\ldots,H_s-1}$ | Not used |

Representative Use Case—URLLC Waveform for Uplink with 2 Resource Blocks

Figure 12:
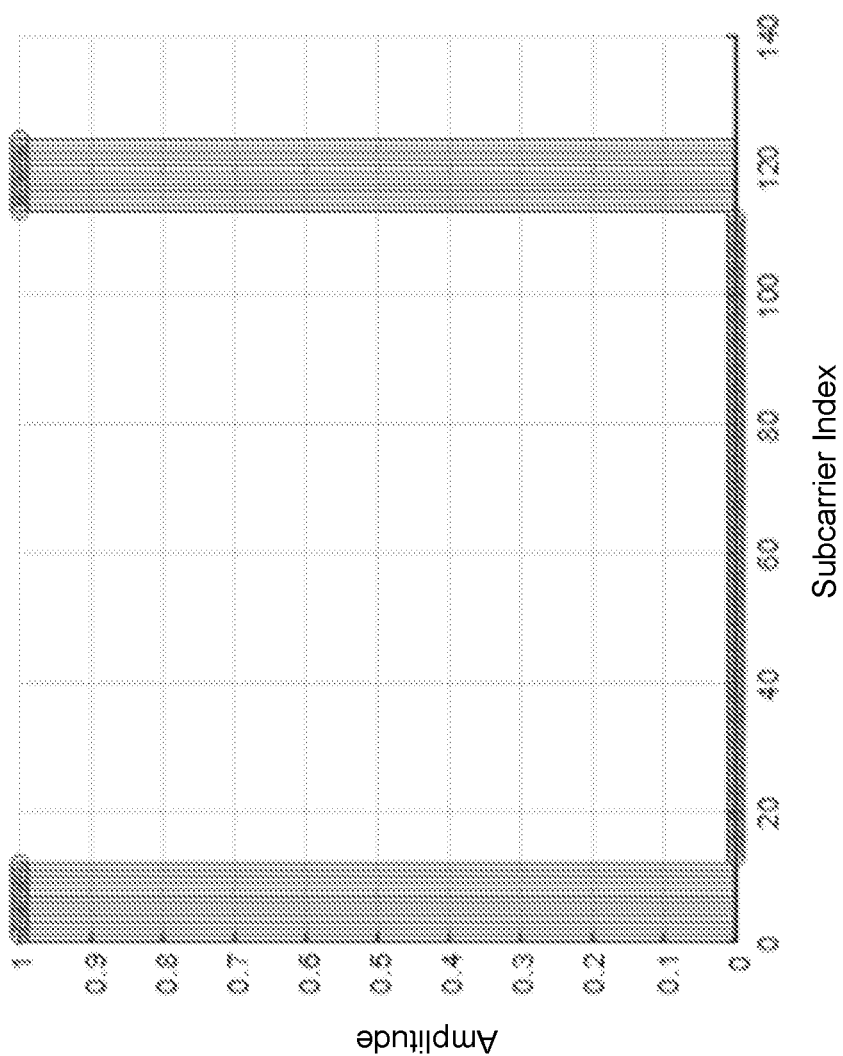
FIG. 12 illustrates an example interlace in accordance with an embodiment.

To enable ultra-reliable and low-latency communications, frequency diversity by using non-contiguous resources allocations may be exploited. For example, 2 RBs separated by S=100 subcarriers may be assigned to a user equipment (UE) for an uplink transmission to transmit (e.g., a small amount of information (e.g., UCI or data)) To increase the reliability of the transmission, an interlace may be generated, such as for example, shown in FIG. 12. The interlace of FIG. 12 may be generated using the transmitter 800 of FIG. 8. The interlace of FIG. 12 may be generated using other transmitters, as well. The parameters listed in Table 14 may be used by the transmitter 800 to generate an interlace for an adjacent configuration. The parameters listed in Table 15 may be used by the transmitter 800 to generate an interlace for an interleaved configuration.

In an embodiment, the transmitter 800 may generate the interlace using the parameters given in Table 4-14 places phase-rotated versions of c and d within one RB (i.e., 12 subcarriers) adjacent to each other. The interlace generated using the parameters listed in Table 14 may carry 10 bits by using 2 RBs. In an embodiment, Bit Group P and/or Bit Group C may be fixed to certain values. For example, Bit Group P may be set to (0,0) and Bit Group C may carry the 8 bits. Fixing Bit Group P and/or Bit Group C to certain values may decrease receiver complexity.

TABLE 14

Example Parameters for Adjacent Configuration for URLLC

| Variable | Value |
|---|---|
| a | (1) |
| b | (1) |
| c | $\frac{\sqrt{2}+i\sqrt{2}}{2} \times (1, i, 1)$ |
| d | $\frac{\sqrt{2}+i\sqrt{2}}{2} \times (1, 1, -1)$ |
| d' | 0 |
| Bit Group P<br>Map P | $(b_0^P, b_1^P)$ that configures $\pi$ |

| $(b_0^P, b_1^P)$ | $\pi$ |
|---|---|
| 00 | [1 2 3] |
| 01 | [2 1 3] |
| 10 | [1 3 2] |
| 11 | [3 2 1] |

TABLE 14-continued

Example Parameters for Adjacent Configuration for URLLC

| Variable | Value |
|---|---|
| Bit Group C<br>Map C | $(b_0^C, b_1^C, \ldots, b_7^C)$ that configures the phase encoder |

| $(b_{2k}^C, b_{2k+1}^C)$ | $c_k$ |
|---|---|
| 00 | 0 |
| 01 | 1 |
| 10 | 2 |
| 11 | 3 |
| for k = 0, 1, 2, 3 | |

| Bit Group D<br>Map D | Fixed value(s)<br>$d_{k|\pi(k)=1} = S$ and $d_{k|\pi(k)\neq 1} = 0$,<br>i.e., the output of shift encoder is fixed to s =<br>(0, 3, 6, 9, S + 12, S + 15, S + 18, S + 21) |
|---|---|
| m | 3 |
| H | 4 |
| $d_{k|k=0,\ldots,H_s-1}$ | Not used |

In an embodiment, the transmitter 800 may generate the interlace using the parameters listed in Table 15 to place phase rotated versions of c and d within one RB (i.e., 12 subcarriers) in interleaved manner. The interlace generated using the parameters listed in Table 15 may carry 10 bits with one interlace. In an embodiment, Bit Group P and/or Bit Group C may be fixed to certain values. For example, Bit Group P may be set to (0,0) and Bit Group C may carry the 8 bits. Fixing Bit Group P and/or Bit Group C to certain values may decrease receiver complexity.

TABLE 15

Example Parameters for Interleaved Configuration for URLLC

| Variable | Value |
|---|---|
| a | (1) |
| b | (1) |
| c | $\frac{\sqrt{2}+i\sqrt{2}}{2} \times (1, 0, 0, 0, i, 0, 0, 0, 1, 0, 0, 0)$ |
| d | $\frac{\sqrt{2}+i\sqrt{2}}{2} \times (1, 0, 0, 0, 1, 0, 0, 0, -1, 0, 0, 0)$ |
| d' | 0 |
| Bit Group P<br>Map P | $(b_0^P, b_1^P)$ that configures $\pi$ |

| $(b_0^P, b_1^P)$ | $\pi$ |
|---|---|
| 00 | [1 2 3] |
| 01 | [2 1 3] |
| 10 | [1 3 2] |
| 11 | [3 2 1] |

| Bit Group C<br>Map C | $(b_0^C, b_1^C, \ldots, b_7^C)$ that configures the phase encoder |
|---|---|

| $(b_{2k}^C, b_{2k+1}^C)$ | $c_k$ |
|---|---|
| 00 | 0 |
| 01 | 1 |
| 10 | 2 |
| 11 | 3 |
| for k = 0, 1, 2, 3 | |

| Bit Group D<br>Map D | Fixed value(s)<br>$d_{k|\pi(k)=3} = -11, d_{k|\pi(k)=2} = -22, d_{k|\pi(k)=1} = -36 + S$,<br>i.e., the output of shift encoder is fixed to s =<br>(0, 1, 2, 3, S + 12, S + 13, S + 14, S + 15) |
|---|---|
| m | 3 |
| H | 4 |
| $d_{k|k=0,\ldots,H_s-1}$ | Not used |

Figure 13:
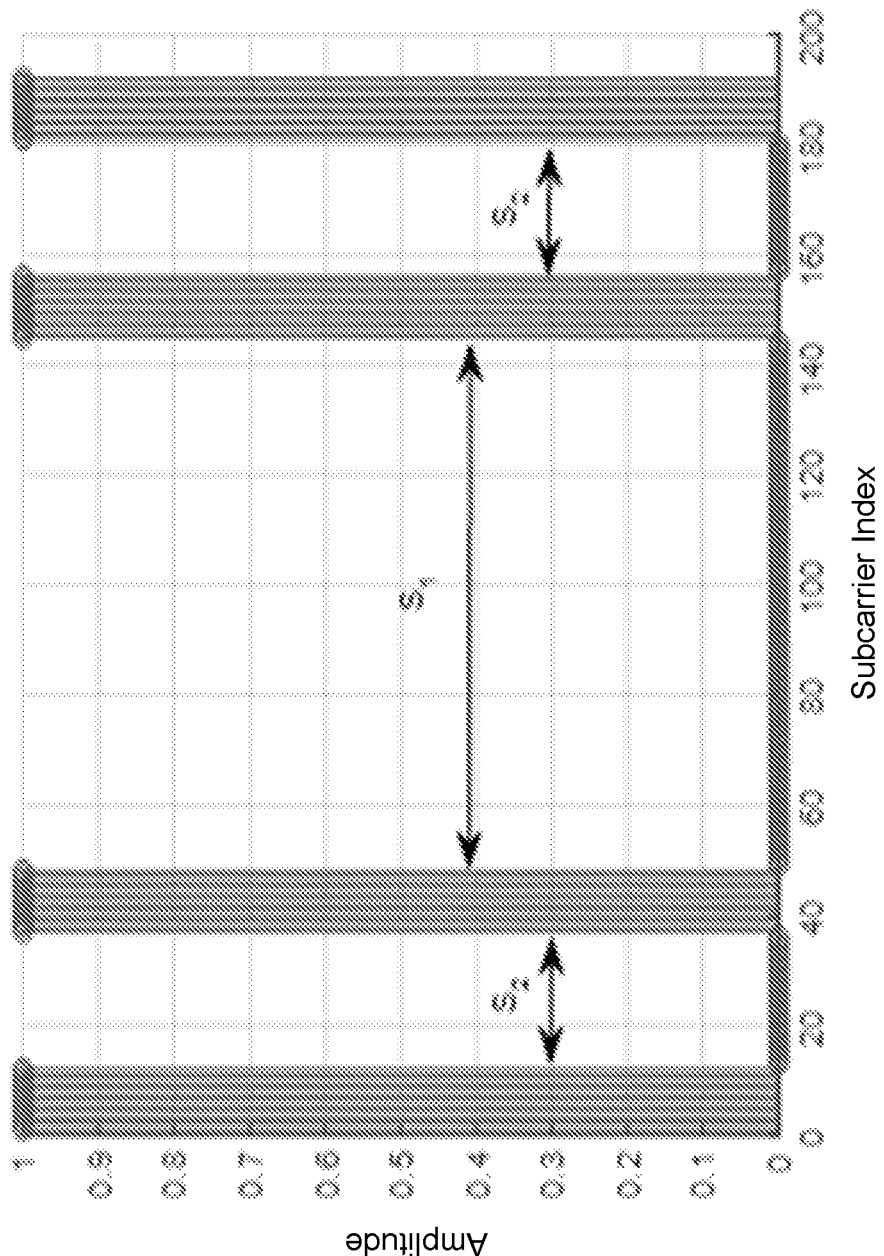
FIG. 13 illustrates an example interlace in accordance with an embodiment.

Representative Use Case—URLLC Waveform for Uplink with 4 Resource Blocks with Non-Uniform Resource Allocation In another URLLC scenario, 4 RBs separated non-uniformly via the parameters of $S_1=96$ and $S_2=24$ subcarriers may be assigned to a UE for an uplink transmission to transmit (e.g., a small amount of information (e.g., UCI or data)). To increase the reliability of the transmission, an interlace may be generated, such as for example, shown in FIG. 13. The interlace of FIG. 13 may be generated using the transmitter 800 of FIG. 8. The interlace of FIG. 13 may be generated using other transmitters, as well. The parameters listed in Table 16 may be used by the transmitter 800 to generate an interlace for an adjacent configuration within one RB. The parameters listed in Table 17 may be used by the transmitter 800 to generate an interlace for an adjacent configuration interleaved configuration within one RB.

In an embodiment, the transmitter 800 may generate the interlace using the parameters listed in Table 16 to place phase-rotated versions of c and d within one RB (i.e., 12 subcarriers) adjacent to each other. The interlace generated using the parameters listed in Table 16 may carry 14 bits by using 4 RBs. In an embodiment, Bit Group P and/or Bit Group C may be fixed to certain values. For example, Bit Group P may be set to (0,0) and Bit Group C may carry the 8 bits. Fixing Bit Group P and/or Bit Group C to certain values may decrease receiver complexity

TABLE 16

Example Parameters for Adjacent Configuration for URLLC

| Variable | Value |
|---|---|
| a | (1) |
| b | (1) |
| c | $\frac{\sqrt{2}+i\sqrt{2}}{2} \times (1, i, 1)$ |
| d | $\frac{\sqrt{2}+i\sqrt{2}}{2} \times (1, 1, -1)$ |
| Bit Group P<br>Map P | $(b_0^P, b_1^P, b_2^P, b_3^P)$ that configures $\pi$ |

| $(b_0^P, b_1^P, b_2^P, b_3^P)$ | $\pi$ |
|---|---|
| 0000 | (4 3 2 1) |
| 0001 | (4 3 1 2) |
| 0010 | (4 2 3 1) |
| 0011 | (4 2 1 3) |
| 0100 | (4 1 3 2) |
| 0101 | (4 1 2 3) |
| 0110 | (3 4 2 1) |
| 0111 | (3 4 1 2) |
| 1000 | (3 2 4 1) |
| 1001 | (3 2 1 4) |
| 1010 | (3 1 4 2) |
| 1011 | (3 1 2 4) |
| 1100 | (2 4 3 1) |
| 1101 | (2 4 1 3) |
| 1110 | (2 3 4 1) |
| 1111 | (2 3 1 4) |

| Bit Group C<br>Map C | $(b_0^C, b_1^C, \ldots, b_9^C)$ that configures the phase encoder |
|---|---|

| $(b_{2k}^C, b_{2k+1}^C)$ | $c_k$ |
|---|---|
| 00 | 0 |
| 01 | 1 |
| 10 | 2 |
| 11 | 3 |
| for k = 0, 1, 2, 3, 4 | |

| Bit Group D<br>Map D | Fixed value(s)<br>$d_{k|\pi(k)=1} = S_1 + S_2, d_{k|\pi(k)=2} = S_2$, and $d_{k|\pi(k)\neq 1,2} = 0$ |
|---|---|
| m | 4 |
| H | 4 |
| $d_{k|k=0,\ldots,H_s-1}$ | Not used |

In an embodiment, the transmitter 800 may generate the interlace using the parameters listed in Table 17 to place phase rotated versions of c and d within one RB (i.e., 12 subcarriers) in an interleaved manner. The interlace generated using the parameters listed in Table 17 may carry 14 bits by using 4 RBs. In an embodiment, Bit Group P and/or Bit Group C may be fixed. For example, Bit Group P may be set to (0,0) and Bit Group C may carry the 8 bits. Fixing Bit Group P and/or Bit Group C to certain values may decrease receiver complexity.

TABLE 17

Example Parameters for Interleaved Configuration for URLLC

| Variable | Value | |
|---|---|---|
| a | (1) | |
| b | (1) | |
| c | $\frac{\sqrt{2}+i\sqrt{2}}{2} \times (1, i, 1)$ | |
| d | $\frac{\sqrt{2}+i\sqrt{2}}{2} \times (1, 1, -1)$ | |
| d' | 0 | |
| Bit Group P | $(b_0^P, b_1^P, b_2^P, b_3^P)$ that configures $\pi$ | |
| Map P | $(b_0^A, b_1^A, b_2^A, b_3^A)$ | $\pi$ |
| | 0000 | (4 3 2 1) |
| | 0001 | (4 3 1 2) |
| | 0010 | (4 2 3 1) |
| | 0011 | (4 2 1 3) |
| | 0100 | (4 1 3 2) |
| | 0101 | (4 1 2 3) |
| | 0110 | (3 4 2 1) |
| | 0111 | (3 4 1 2) |
| | 1000 | (3 2 4 1) |
| | 1001 | (3 2 1 4) |
| | 1010 | (3 1 4 2) |
| | 1011 | (3 1 2 4) |

TABLE 17-continued

Example Parameters for Interleaved Configuration for URLLC

| Variable | Value | |
|---|---|---|
| | 1100 | (2 4 3 1) |
| | 1101 | (2 4 1 3) |
| | 1110 | (2 3 4 1) |
| | 1111 | (2 3 1 4) |
| Bit Group C | $(b_0^C, b_1^C, \ldots, b_9^C)$ that configures the phase encoder | |
| Map C | $(b_{2k}^C, b_{2k+1}^C)$ | $c_k$ |
| | 00 | 0 |
| | 01 | 1 |
| | 10 | 2 |
| | 11 | 3 |
| | for k = 0, 1, 2, 3, 4 | |
| Bit Group D | Fixed value(s) | |
| Map D | $d_{k|\pi(k)=1} = -72 + S_1 + S_2$, $d_{k|\pi(k)=2} = -36 + S_2$, and $d_{k|\pi(k)=3} = -22$, and $d_{k|\pi(k)=4} = -11$ | |
| m | 4 | |
| H | 4 | |
| $d_{k|k=0,\ldots,H_S-1}$ | Not used | |

Representative Use Case—2 Resource Blocks with 16-QAM and QPSK

In an embodiment, the transmitter 800 may generate the interlace using the parameters listed in Table 18 to place phase-rotated versions of c and d within one RB (i.e., 12 subcarriers) adjacent to each other. The parameters listed in Table 18 may be used to generate a resource allocation, such as, for example, shown in FIG. 14. In an embodiment, Bit Group P, Bit Group AB, and/or Bit Group C may be fixed to certain values. For example, Bit Group P may be set to (0,0) and Bit Group AB and Bit Group C may carry the 11 bits. Fixing Bit Group P Group AB, and/or Bit Group C to certain values may decrease receiver complexity.

TABLE 18

Example Parameters for Adjacent Configuration for URLLC

| Variable | Value | | | | | |
|---|---|---|---|---|---|---|
| a | (1) | | | | | |
| b | (1) | | | | | |
| c | $\frac{\sqrt{2}+i\sqrt{2}}{2} \times (1, i, 1)$ | | | | | |
| d | $\frac{\sqrt{2}+i\sqrt{2}}{2} \times (1, 1, -1)$ | | | | | |
| d' | 0 | | | | | |
| Bit Group P | $(b_0^P, b_1^P)$ that configures $\pi$ | | | | | |
| Map P | $(b_0^P, b_1^P)$ | $\pi$ | | | | |
| | 00 | [1 2 3] | | | | |
| | 01 | [2 1 3] | | | | |
| | 10 | [1 3 2] | | | | |
| | 11 | [3 2 1] | | | | |
| Bit Group AB | Binary | | | | | |
| Map AB | $(b_0^{AB}, b_1^{AB}, b_2^{AB})$ | $a_1$ | $a_2$ | $a_3$ | $b_1$ | $b_2$ | $b_3$ |
| | 000 | 0 | 0 | 0 | 0 | 0 | 0 |
| | 001 | $\frac{2}{\pi}\ln 3$ | 0 | 0 | 0 | 0 | 0 |
| | 010 | 0 | $\frac{2}{\pi}\ln 3$ | 0 | 0 | 0 | 0 |
| | 011 | 0 | 0 | $\frac{2}{\pi}\ln 3$ | 0 | 0 | 0 |

TABLE 18-continued

Example Parameters for Adjacent Configuration for URLLC

| Variable | Value | | | | | | |
|---|---|---|---|---|---|---|---|
| | 100 | 0 | 0 | 0 | $\frac{2}{\pi}\ln 3$ | 0 | 0 |
| | 101 | 0 | 0 | 0 | 0 | $\frac{2}{\pi}\ln 3$ | 0 |
| | 110 | 0 | 0 | 0 | 0 | 0 | $\frac{2}{\pi}\ln 3$ |
| | 111 | $\frac{2}{\pi}\ln 3$ | 0 | 0 | $\frac{2}{\pi}\ln 3$ | 0 | 0 |

| Bit Group C | $(b_0^C, b_1^C, \ldots, b_7^C)$ that configures the phase encoder |
|---|---|
| Map C | $(b_{2k}^C, b_{2k+1}^C)$     $c_k$ |
| | 00     0 |
| | 01     1 |
| | 10     2 |
| | 11     3 |
| | for k = 0, 1, 2, 3 |
| Bit Group D | Fixed value(s) |
| Map D | $d_{k \mid \pi(k)=1} = S$ and $d_{k \mid \pi(k) \neq 1} = 0$, |
| | i.e., the output of shift encoder is fixed to s = |
| | (0, 3, 6, 9, S + 12, S + 15, S + 18, S + 21) |
| m | 3 |
| H | 4 |
| $d_{k \mid k=0,\ldots,H_s-1}$ | Not used |

Figure 14:
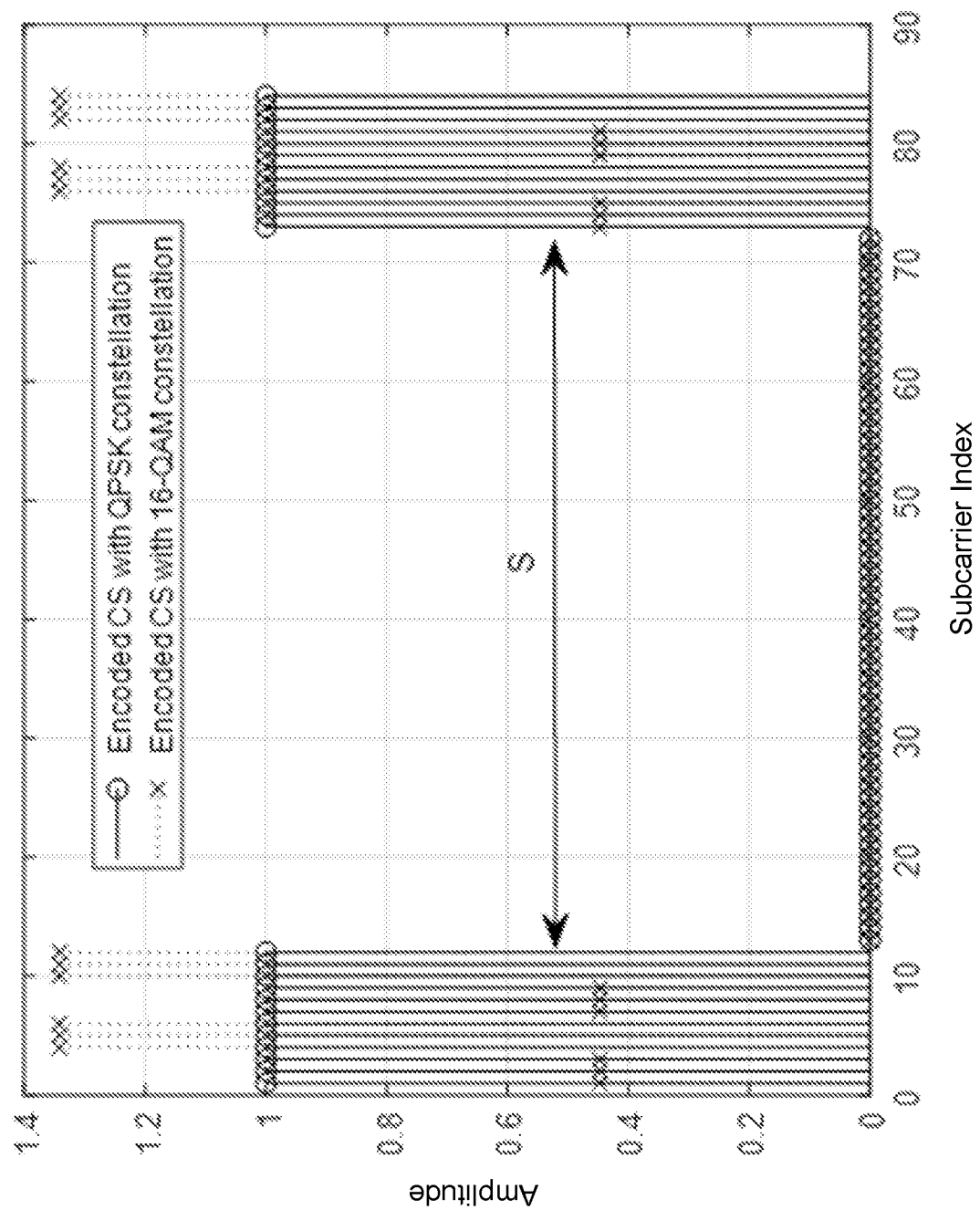
FIG. 14 illustrates an example interlace in accordance with an embodiment.

FIG. 14 illustrates an interlace with 2 RBs generated with QPSK and 16-QAM. The interlace of FIG. 14 may be generated using the transmitted 900 of FIG. 9. The interlace of FIG. 14 may be generated using other transmitters, as well.

In an embodiment, FIG. 14 may illustrate an example of a mapped non-contiguous CS in frequency domain for an OFDM transmitter with normalized QPSK and 16-QAM constellations when m=4, $\pi$=(1,2,3), $a_{k \mid k=2,3}$=0, $b_{k \mid k=1,2,3}$=0, $c_{k \mid k=0,1,2,3}$=0, S=60. When $a_3$=0, a non-contiguous CS with two clusters of length of 12 separated by 60 subcarriers and the alphabet for the corresponding sequence is an \ac{QPSK} constellation may be generated by the transmitter 900. If $$a_3 = \frac{2}{\pi}\ln 3,$$

the transmitter 900 may generate a non-contiguous CS with 16-QAM with the same resource allocation. Both of the corresponding OFDM signals achieve frequency diversity via two clusters well-separated in frequency while maintaining PAPR of 3 dB.

The contents of each of the following are incorporated by reference herein: [1] Matthew G. Parker, Kenneth G. Paterson, and Chintha Tellambura, "Golay Complementary Sequences", 2004; [2] B. M. Popovic, "Synthesis of power efficient multitone signals with flat amplitude spectrum," in IEEE Transactions on Communications, vol. 39, no. 7, pp. 1031-1033, July 1991; [3] S. Z. Budisin, "Efficient Pulse Compressor for Golay Complementary Sequences", 1990; [4] W. H. Holzmann and H. Kharaghani, "A computer search for complex Golay sequences", 1994; [5] M. Golay, "Complementary series," in IRE Transactions on Information Theory, vol. 7, no. 2, pp. 82-87, April 1961; [6] R. Sivaswamy, "Multiphase Complementary Codes," in IEEE Transactions on Information Theory, vol. 24, no. 5, pp. 546-552, September 1978; [7] R. Turyn, "Hadamard matrices, Baumert-Hall units, four-symbol sequences, pulse compression, and surface wave encodings," J. Comb. Theory Ser. A, 16, pp. 313-333, 1974; [8] J. A. Davis and J. Jedwab, "Peak-to-mean power control in OFDM, Golay complementary sequences, and Reed-Muller codes," in IEEE Transactions on Information Theory, vol. 45, no. 7, pp. 2397-2417, November 1999; [9] K. G. Paterson, "Generalized Reed-Muller codes and power control in OFDM modulation," in IEEE Transactions on Information Theory, vol. 46, no. 1, pp. 104-120, January 2000; and [10] Alphan Sahin and Rui Yang, "A Generic Complementary Sequence Encoder", Draft, 12 pages, Sep. 3, 2018.

Representative Procedures

FIGS. 15-18 are flow diagrams illustrating representative procedures 1500-1800 in accordance with various embodiments. The representative procedures 1500-1800 of FIGS. 15-18 may be carried out using or implemented in a transmitter, such as the transmitter 700 (FIG. 7), the transmitter 800 (FIG. 8), the transmitter 900 (FIG. 9) or any other transmitter comprising circuitry, including a processor and a memory, configured to perform the representative procedures 1500-1800.

Figure 15:
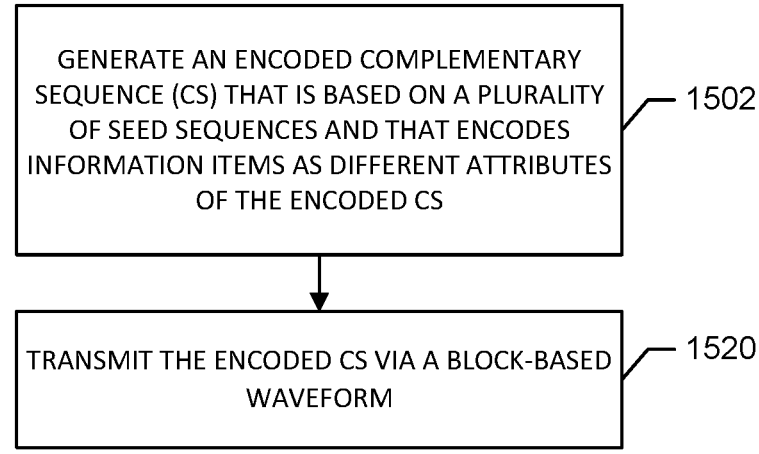

Referring to FIG. 15, the transmitter may generate an encoded CS that is based on a plurality of seed sequences and that encodes each of a plurality of sets of information items as a different attribute of the encoded CS (1502). Thereafter, the transmitter may transmit the encoded cs via a block-based waveform (1520).

Figure 16:
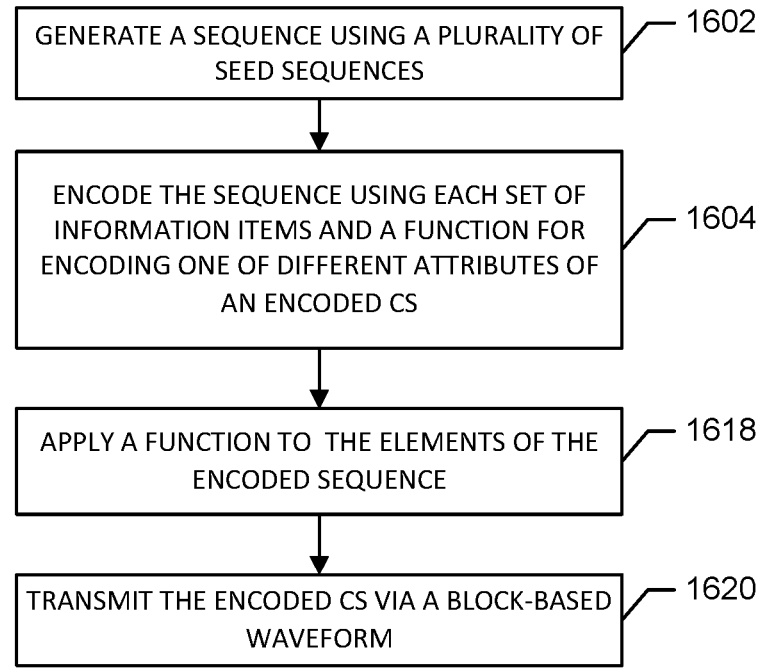

Referring to FIG. 16, the transmitter may generate (e.g., synthesize) a sequence ("synthesized sequence") using a plurality of seed sequences (1602). The transmitter may generate the synthesized sequence using a configuration parameter (e.g. d'), as well. The transmitter may encode the synthesized sequence using each set of information items and a function for encoding one of different attributes of an encoded CS (1604). The transmitter may apply a function to (e.g., perform summation of the elements) the encoded sequence (1618). The transmitter may transmit a resulting encoded CS via a block-based waveform (1620).

Referring to FIG. 17, the transmitter may generate (e.g., synthesize) a synthesized sequence using a plurality of seed sequences (1702). The transmitter may generate the synthesized sequence using a configuration parameter (e.g. d'), as well. The transmitter may perform a first encoding of the synthesized sequence to generate a first encoded sequence that encodes a first set of a plurality of information items as a first of a plurality of different attributes of an encoded CS (1706). The transmitter, for example, may perform order encoding of the synthesized sequence at least in part by juxtapositioning elements of the synthesized sequence based on the first set of a plurality of information items.

The transmitter may perform a second encoding of the first encoded sequence to generate a second encoded sequence that encodes a second set of the plurality of information items as a second of the different attributes (1708). The transmitter, for example, may perform phase encoding of the first encoded sequence at least in part by phase rotating elements of the first encoded sequence based on the second set of the plurality of information items.

The transmitter may perform a third encoding of the second encoded sequence to generate a third encoded sequence that encodes a third set of the plurality of information items as a third of the different attributes (1710). The transmitter, for example, may perform shift encoding of the second encoded sequence at least in part by shifting (e.g., zero padding) elements of the second encoded sequence based on the third set of the plurality of information items and a resource allocation.

The transmitter may apply a function to (e.g., perform summation of the elements) the encoded sequence (1718). The transmitter may transmit a resulting encoded CS via a block-based waveform (1720).

Referring to FIG. 18, the transmitter may generate (e.g., synthesize) a synthesized sequence using a plurality of seed sequences (1802). The transmitter may generate the synthesized sequence using a configuration parameter (e.g. d'), as well. The transmitter may perform a first encoding of the synthesized sequence to generate a first encoded sequence that encodes a first set of a plurality of information items as a first of a plurality of different attributes of an encoded CS (1806). The transmitter, for example, may perform order encoding of a sequence at least in part by juxtapositioning elements of the sequence based on the first set of a plurality of information items.

The transmitter may perform a second encoding of the first encoded sequence to generate a second encoded sequence that encodes a second set of the plurality of information items as a second of the different attributes (1809). The transmitter, for example, may perform amplitude encoding of the first encoded sequence at least in part by adjusting at least one amplitude of at least one element of the first encoded sequence based on the second set of the plurality of information items.

The transmitter may perform a third encoding of the second encoded sequence to generate a third encoded sequence that encodes a third set of the plurality of information items as a third of the different attributes (1810). The transmitter, for example, may perform phase encoding of the first encoded sequence at least in part by phase rotating elements of the first encoded sequence based on the second set of the plurality of information items.

The transmitter may perform a fourth encoding of the third encoded sequence to generate a fourth encoded sequence that encodes a fourth set of the plurality of information items as a third of the different attributes (1810). The transmitter, for example, may perform shift encoding of the second encoded sequence at least in part by shifting (e.g., zero padding) elements of the second encoded sequence based on the third set of the plurality of information items and a resource allocation.

The transmitter may apply a function to (e.g., perform summation of the elements) the encoded sequence (1818). The transmitter may transmit a resulting encoded CS via a block-based waveform (1820).

In various embodiments, such as in connection with representative procedures 1500-1800, each of the plurality of seed sequences may have fewer elements than the generated encoded CS. In various embodiments, such as in connection with representative procedure 1700, each of the plurality of seed sequences may has fewer elements than any of the sequence, the first encoded sequence, the second encoded sequence and the third encoded sequence. In various embodiments, the first encoded sequence may have fewer (or more) elements than the second encoded sequence. In various embodiments, the second encoded sequence may have fewer (or more) elements than the third encoded sequence. In various embodiments, the first encoded sequence may have fewer (or more) elements than the third encoded sequence.

In various embodiments, such as in connection with representative procedure 1800, each of the plurality of seed sequences may have fewer elements than the sequence, the first encoded sequence, the second encoded sequence, the third encoded sequence and the fourth encoded sequence. In various embodiments, the first encoded sequence may have fewer (or more) elements than the second encoded sequence. In various embodiments, the second encoded sequence may have fewer (or more) elements than the third encoded sequence. In various embodiments, the third encoded sequence may have fewer (or more) elements than the fourth encoded sequence. In various embodiments, the first encoded sequence may have fewer (or more) elements than the third or fourth encoded sequence. In various embodiments, the second encoded sequence may have fewer (or more) elements than the fourth encoded sequence. In various embodiments, a subsequent encoded sequence may have fewer (or more) elements than its (e.g., immediate) prior encoded sequence.

In various embodiments, such as in connection with representative procedures 1500-1800, the elements of the encoded complementary sequence may include a plurality of non-zero valued elements and zero or more null valued elements. In various embodiments, such as in connection with representative procedures 1500-1800, each seed sequence may be a complementary sequence pair. In various embodiments, such as in connection with representative procedures 1500-1800, the different attributes may be any of (i) juxtaposition of elements of the encoded complementary sequence; (ii) phases of elements of the encoded complementary sequence; (iii) an amount of null valued elements of the encoded complementary sequence; and (iv) amplitudes of elements of the encoded complementary sequence.

In various embodiments, such as in connection with representative procedure 1700, any of the plurality of seed sequences, the sequence, the first encoded sequence, the second encoded sequence and the third encoded sequence may be a complementary sequence. In various embodiments, such as in connection with representative procedure 1800, any of the plurality of seed sequences, the [synthesized] sequence, the first encoded sequence, the second encoded sequence, the third encoded sequence and the fourth encoded sequence may be a complementary sequence.

In various embodiments, such as in connection with representative procedure 1700, any of the first set of the plurality of information items, the second set of the plurality of information items and the third set of the plurality of information items may be a set of fixed values. In various embodiments, such as in connection with representative procedure 1800, any of the first set of the plurality of information items, the second set of the plurality of information items, the third set of the plurality of information items and the fourth set of the plurality of information items may be a set of fixed values.

In various embodiments, such as in connection with representative procedures 1700-1800, the plurality of information items may be any of a plurality of information bits and a plurality of coded information bits. In various embodiments, such as in connection with representative procedure 1700, the first set of the plurality of information items may be any of a set of information bits and a set of coded information bits. In various embodiments, such as in connection with representative procedures 1700-1800, the second set of the plurality of information items may be any of a set of information bits and a set of coded information bits. In various embodiments, such as in connection with representative procedures 1700-1800, the third set of the plurality of information items may be any of a set of information bits and a set of coded information bits. In various embodiments, such as in connection with representative procedure 1800, the fourth set of the plurality of information items may be any of a set of information bits and a set of coded information bits.

In various embodiments, such as in connection with representative procedure 1700, any of the first set of the plurality of information items, the second set of the plurality of information items and the third set of the plurality of information items may be a set of information items separate from the plurality of information items. In various embodiments, such as in connection with representative procedure 1800, any of the first set of the plurality of information items, the second set of the plurality of information items, the third set of the plurality of information items and the fourth set of the plurality of information items may be a set of information items separate from the plurality of information items.

In various embodiments, such as in connection with representative procedures 1500-1800, the encoded CS limits PAPR of a resulting OFDM signal to a low level (e.g., 3 dB).

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIG. 1.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

What is claimed is:

1. A method implemented in an apparatus comprising a transmitter, the method comprising:
   generating an encoded complementary sequence based on a plurality of seed sequences and a plurality of intermediate encoded sequences, wherein:
   an order of elements of a first of the plurality of intermediate encoded sequences encodes a first set of a plurality of information items;
   phases of elements of a second of the plurality of intermediate encoded sequences encode a second set of the plurality of information items;
   an amount of null valued elements of a third of the plurality of intermediate encoded sequences encodes a third set of the plurality of information items; and
   each of the plurality of seed sequences is a complementary sequence; and
   transmitting the encoded complementary sequence via a block-based waveform.

2. The method of claim 1, wherein generating the encoded complementary sequence comprises:
   generating a sequence using the plurality of seed sequences;
   encoding the sequence to form the first of the plurality of intermediate encoded sequences at least in part by ordering elements of the sequence based on the first set of the plurality of information items;

encoding the first intermediate encoded sequence to form the second of the plurality of intermediate encoded sequences at least in part by phase rotating elements of the first intermediate encoded sequence based on the second set of the plurality of information items;

encoding the second encoded sequence to form the third of the plurality of intermediate encoded sequences at least in part by shifting elements of the second intermediate encoded sequence based on the third set of the plurality of information items and a resource allocation; and performing a summation of elements of the third intermediate encoded sequence.

3. The method of claim 1, wherein generating the encoded complementary sequence comprises:

encoding the sequence to form the first of the plurality of intermediate encoded sequences at least in part by ordering elements of the sequence based on the first set of the plurality of information items;

encoding the first intermediate encoded sequence to form the second of the plurality of intermediate encoded sequences at least in part by adjusting at least one amplitude of at least one element of the first intermediate encoded sequence based on the second set of the plurality of information items;

encoding the second intermediate encoded sequence to form a fourth of the plurality of intermediate encoded sequences least in part by phase rotating elements of the second intermediate encoded sequence based on the third set of the plurality of information items;

encoding the fourth intermediate encoded sequence to form the third of the plurality of intermediary encoded sequences at least in part by shifting elements of the fourth intermediate encoded sequence based on the third set of the plurality of information items and a resource allocation; and performing a summation of elements of the fourth intermediate encoded sequence.

4. The method of claim 2, wherein each of the plurality of seed sequences has fewer elements than any of the sequence, the first intermediate encoded sequence, the second intermediate encoded sequence, the third intermediate encoded sequence and the encoded complementary sequence.

5. The method of claim 3, wherein each of the plurality of seed sequences has fewer elements than any of the sequence, the first intermediate encoded sequence, the second intermediate encoded sequence, the third intermediate encoded sequence, the fourth intermediate encoded sequence and the encoded complementary sequence.

6. The method of claim 1, wherein the elements of the encoded complementary sequence comprise a plurality of non-zero valued elements and zero or more zero or null valued elements.

7. The method of claim 1, wherein the plurality of seed sequences comprises a complementary sequence pair.

8. The method of claim 2, wherein any of the first intermediate encoded sequence, the second intermediate encoded sequence and the third intermediate encoded sequence is a complementary sequence.

9. The method of claim 3, wherein any of the first intermediate encoded sequence, the second intermediate encoded sequence, the third intermediate encoded sequence and the fourth intermediate encoded sequence is a complementary sequence.

10. An apparatus comprising circuitry, including a transmitter, a receiver, a processor and memory, configured to:

generate an encoded complementary sequence based on a plurality of seed sequences and a plurality of intermediate encoded sequences, wherein:

an order of elements of a first of the plurality of intermediate encoded sequences encodes a first set of a plurality of information items;

phases of elements of a second of the plurality of intermediate encoded sequences encode a second set of the plurality of information items;

an amount of null valued elements of a third of the plurality of intermediate encoded sequences encodes a third set of the plurality of information items; and each of the plurality of seed sequences is a complementary sequence; and transmit the encoded complementary sequence via a block-based waveform.

11. The apparatus of claim 10, wherein the circuitry being configured to generate an encoded complementary sequence comprises the circuitry being configured to:

generate a sequence using the plurality of seed sequences;

encode the sequence to form the first of the plurality of intermediate encoded sequences at least in part by ordering elements of the sequence based on the first set of the plurality of information items;

encode the first intermediate encoded sequence to form the second of the plurality of intermediate encoded sequences at least in part by phase rotating elements of the first intermediate encoded sequence based on the second set of the plurality of information items;

encode the second intermediate encoded sequence to form the third of the plurality of intermediate encoded sequences at least in part by shifting elements of the second intermediate encoded sequence based on the third set of the plurality of information items and a resource allocation; and perform a summation of elements of the third intermediate encoded sequence.

12. The apparatus of claim 10, wherein the circuitry being configured to generate an encoded complementary sequence comprises the circuitry being configured to:

generate a sequence using the plurality of seed sequences;

encode the sequence to form the first of the plurality of intermediate encoded sequences at least in part by ordering elements of the sequence based on the first set of the plurality of information items;

encode the first intermediate encoded sequence to form the second of the plurality of intermediate encoded sequences at least in part by adjusting at least one amplitude of at least one element of the first intermediate encoded sequence based on the second set of the plurality of information items;

encode the second intermediate encoded sequence to form a fourth of the plurality of intermediate encoded sequences at least in part by phase rotating elements of the second intermediate encoded sequence based on a fourth set of the plurality of information items;

encode the fourth intermediate encoded sequence to form the third of the plurality of intermediary encoded sequences at least in part by shifting elements of the fourth intermediate encoded sequence based on the third set of the plurality of information items and a resource allocation; and perform a summation of elements of the third intermediate encoded sequence.

13. The apparatus of claim 11, wherein each of the plurality of seed sequences has fewer elements than any of the sequence, the first intermediate encoded sequence, the second intermediate encoded sequence, the third intermediate encoded sequence and the encoded complementary sequence.

14. The apparatus of claim 12, wherein each of the plurality of seed sequences has fewer elements than any of the sequence, the first intermediate encoded sequence, the second intermediate encoded sequence, the third intermediate encoded sequence, the fourth intermediate encoded sequence and the encoded complementary sequence.

15. The apparatus of claim 10, wherein the elements of the encoded complementary sequence comprise a plurality of non-zero valued elements and zero or more zero or null valued elements.

16. The apparatus of claim 10, wherein the plurality of seed sequences comprises a complementary sequence pair.

17. The apparatus of claim 11, wherein any of the first intermediate encoded sequence, the second intermediate encoded sequence and the third intermediate encoded sequence is a complementary sequence.

18. The apparatus of claim 12, wherein any of the first intermediate encoded sequence, the second intermediate encoded sequence, the third intermediate encoded sequence and the fourth intermediate encoded sequence is a complementary sequence.

19. The apparatus of claim 10, wherein the encoded complementary sequence is transmitted using non-contiguous resources.

20. The apparatus of claim 15, wherein:
the zero or more zero or null valued elements comprise a plurality of zero or null valued elements, and
the plurality of zero or null valued elements comprise a plurality of contiguous zero or null valued elements; or
the plurality of zero or null valued elements lack a plurality of contiguous zero or null valued elements.

21. The method of claim 1, wherein the encoded complementary sequence is transmitted using non-contiguous resources.

22. The method of claim 6, wherein:
the zero or more zero or null valued elements comprise a plurality of zero or null valued elements, and
the plurality of zero or null valued elements comprise a plurality of contiguous zero or null valued elements; or
the plurality of zero or null valued elements lack a plurality of contiguous zero or null valued elements.

* * * * *